(12) United States Patent
Xu et al.

(10) Patent No.: US 12,713,263 B2
(45) Date of Patent: Aug. 18, 2026

(54) METHOD AND APPARATUS FOR HANDLING QoE REPORT IN A SECONDARY NODE IN A WIRELESS COMMUNICATION SYSTEM

(71) Applicant: LG Electronics Inc., Seoul (KR)

(72) Inventors: Jian Xu, Seoul (KR); Daewook Byun, Seoul (KR); Seokjung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 282 days.

(21) Appl. No.: 18/287,340

(22) PCT Filed: Jan. 17, 2022

(86) PCT No.: PCT/KR2022/000798

§ 371 (c)(1), (2) Date: Oct. 18, 2023

(87) PCT Pub. No.: WO2022/225142

PCT Pub. Date: Oct. 27, 2022

(65) Prior Publication Data

US 2024/0205715 A1 Jun. 20, 2024

(30) Foreign Application Priority Data

Apr. 22, 2021 (KR) ........................ 10-2021-0052630

(51) Int. Cl.
*H04L 5/00* (2006.01)
*H04W 24/10* (2009.01)
(Continued)

(52) U.S. Cl.
CPC .................................. *H04W 24/10* (2013.01)

(58) Field of Classification Search
CPC ... H04L 41/5067; H04L 43/065; H04L 43/08; H04L 41/147; H04L 41/16; H04L 41/22;
(Continued)

(56) References Cited

U.S. PATENT DOCUMENTS 12,160,377 B2 * 12/2024 Zhu ....................... H04L 5/0032
12,207,136 B2 * 1/2025 Johansson ............ H04W 24/04
(Continued)

FOREIGN PATENT DOCUMENTS

WO 2020/150952 A1 7/2020
WO WO 2021/028397 2/2021

OTHER PUBLICATIONS

'3GPP; TSG RAN; Study on NR QoE management and optimizations for diverse services (Release 17)', 3GPP TR 38.890 V1.0.0, Apr. 9, 2021 (Year: 2021).*
(Continued)

*Primary Examiner* — Sithu Ko
*Assistant Examiner* — Anneilian Lalchinthang
(74) *Attorney, Agent, or Firm* — Fish & Richardson P.C.

(57) ABSTRACT

A method and apparatus for handling QoE report in a secondary node in a wireless communication system is provided. An SN transmits, to a UE, a configuration for Quality of Experience (QoE) measurement. The QoE measurement is initiated by an Operations, Administration and Maintenance (OAM) and/or a master node (MN). An SN receives, from the UE, a QoE report based on the configuration. An SN determines whether to forward the QoE report to (i) a Trace Collection Entity (TCE) and/or a Measurement Collection Entity (MCE) and/or (ii) the MN, based on which entity among the OAM and/or the MN initiates the QoE measurement. An SN forwards the QoE report based on the determination.

7 Claims, 16 Drawing Sheets

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit, driving unit, computing unit)

(51) Int. Cl.
*H04W 28/08* (2023.01)
*H04W 36/00* (2009.01)

(58) Field of Classification Search
CPC ............... H04L 43/045; H04L 5/0032; H04W 36/0094; H04W 24/08; H04W 24/10; H04W 36/0069; H04W 36/0058; H04W 28/0992; H04W 76/15; H04W 88/18
USPC .......................................................... 370/252
See application file for complete search history.

(56) References Cited

U.S. PATENT DOCUMENTS

| | | | | |
|---|---|---|---|---|
| 2013/0114446 | A1* | 5/2013 | Liu | H04W 24/10<br>370/252 |
| 2022/0070709 | A1* | 3/2022 | Kumar | H04W 24/08 |
| 2023/0231779 | A1* | 7/2023 | Centonza | H04L 41/5067<br>370/252 |
| 2023/0308919 | A1* | 9/2023 | Barac | H04L 65/80 |
| 2024/0089819 | A1* | 3/2024 | Lunardi | H04W 24/10 |
| 2024/0098532 | A1* | 3/2024 | Rune | H04W 24/08 |
| 2024/0196248 | A1* | 6/2024 | Jeong | H04W 24/10 |
| 2024/0235964 | A9* | 7/2024 | Choi | H04L 41/0806 |

OTHER PUBLICATIONS

3GPP TR 38.890 V1.0.0 (Mar. 2021), 3rd Generation Partnership Project Technical Specification Group Radio Access Network, Study on NR QoE management and optimizations for diverse services (Release 17), Mar. 2021, 18 pages.

China Unicom, "Further discussion on NR QoE solutions," 3GPP TSG-RAN WG3 Meeting #110e, R3-206492, Nov. 2-12, 2020, 6 pages.

Huawei, "Further discussions on the remaining open issues of QoE configuration and reporting," 3GPP TSG-RAN WG3 Meeting #111-e, R3-210820, E-meeting, Jan. 25-Feb. 5, 2021, 3 pages.

International Search Report and Written Opinion in Appln. No. PCT/KR2022/000798, mailed on Apr. 25, 2022, 4 pages.

ZTE, "Further consideration on study of NR QoE," 3GPP TSG-RAN WG3 #110-e, R3-206713, Nov. 2-12, 2020, Online, 7 pages.

China Unicom, "Summary document on AI 8.14 NR QoE SI," R2-2102243, 3GPP TSG-RAN WG2 Meeting #113e, Electronic Meeting, Jan. 25-Feb. 5, 2021, 13 pages.

Extended European Search Report in European Appln. No. 22791845.5, mailed on Feb. 4, 2025, 16 pages.

Huawei, China Unicom, "Discussions on potential RAN3 impacts about the QoE measurement configuration, reporting and releasing under SA, NSA and MR-DC operation," R3-206734, 3GPP TSG-RAN WG3 Meeting #110-e, Nov. 2-12, 2020, 7 pages

* cited by examiner

Figure 1:
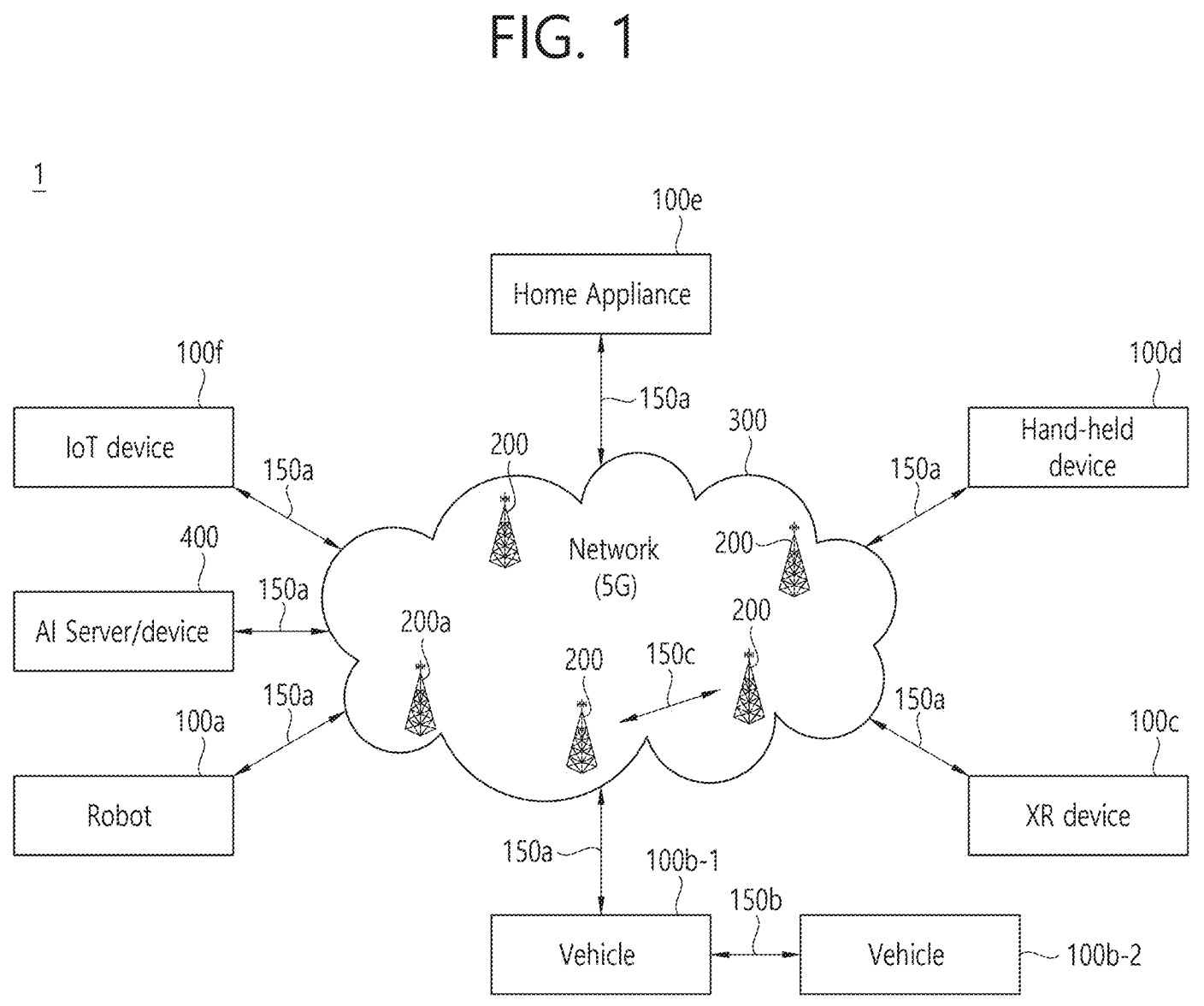

IoT device 100f
AI Server/device 400
Robot 100a
Home Appliance 100e
Hand-held device 100d
XR device 100c
Vehicle 100b-1
Vehicle 100b-2
Network (5G) 300
200
200a
150a
150b
150c

FIG. 2

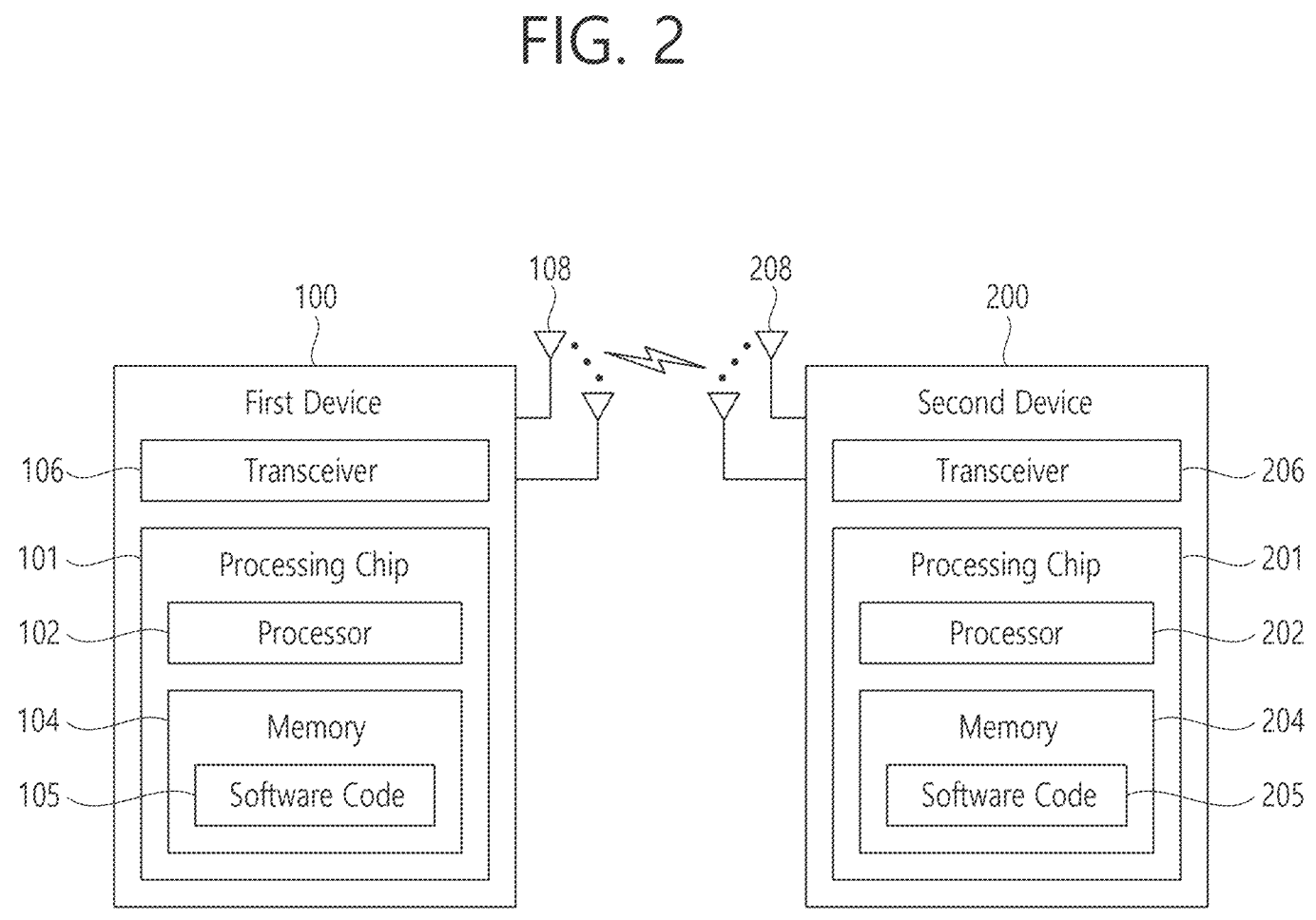

100
First Device
106 Transceiver
101 Processing Chip
102 Processor
104 Memory
105 Software Code
108

200
Second Device
206 Transceiver
201 Processing Chip
202 Processor
204 Memory
205 Software Code
208

FIG. 3

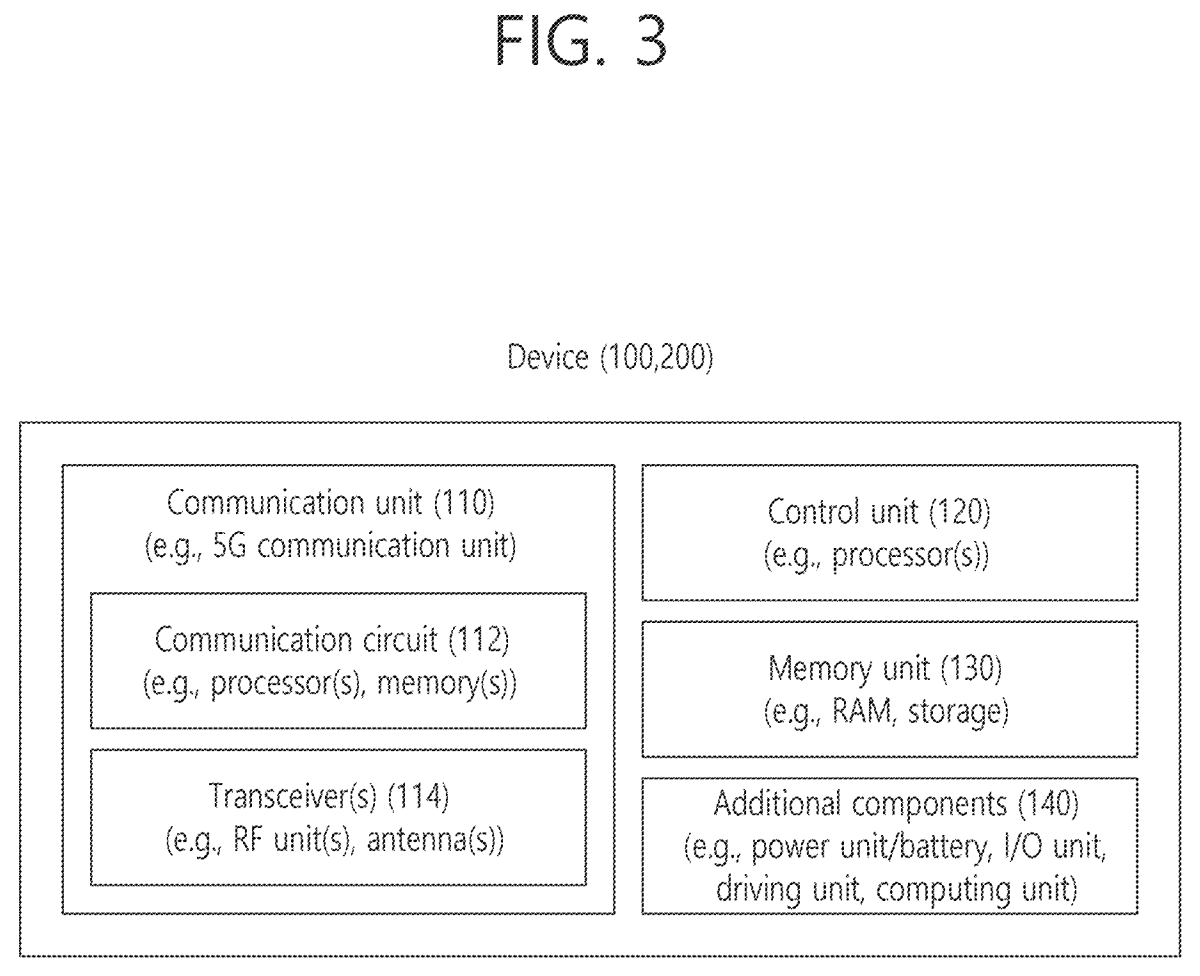

Device (100,200)

Communication unit (110)
(e.g., 5G communication unit)

Communication circuit (112)
(e.g., processor(s), memory(s))

Transceiver(s) (114)
(e.g., RF unit(s), antenna(s))

Control unit (120)
(e.g., processor(s))

Memory unit (130)
(e.g., RAM, storage)

Additional components (140)
(e.g., power unit/battery, I/O unit, driving unit, computing unit)

[Fig. 4]
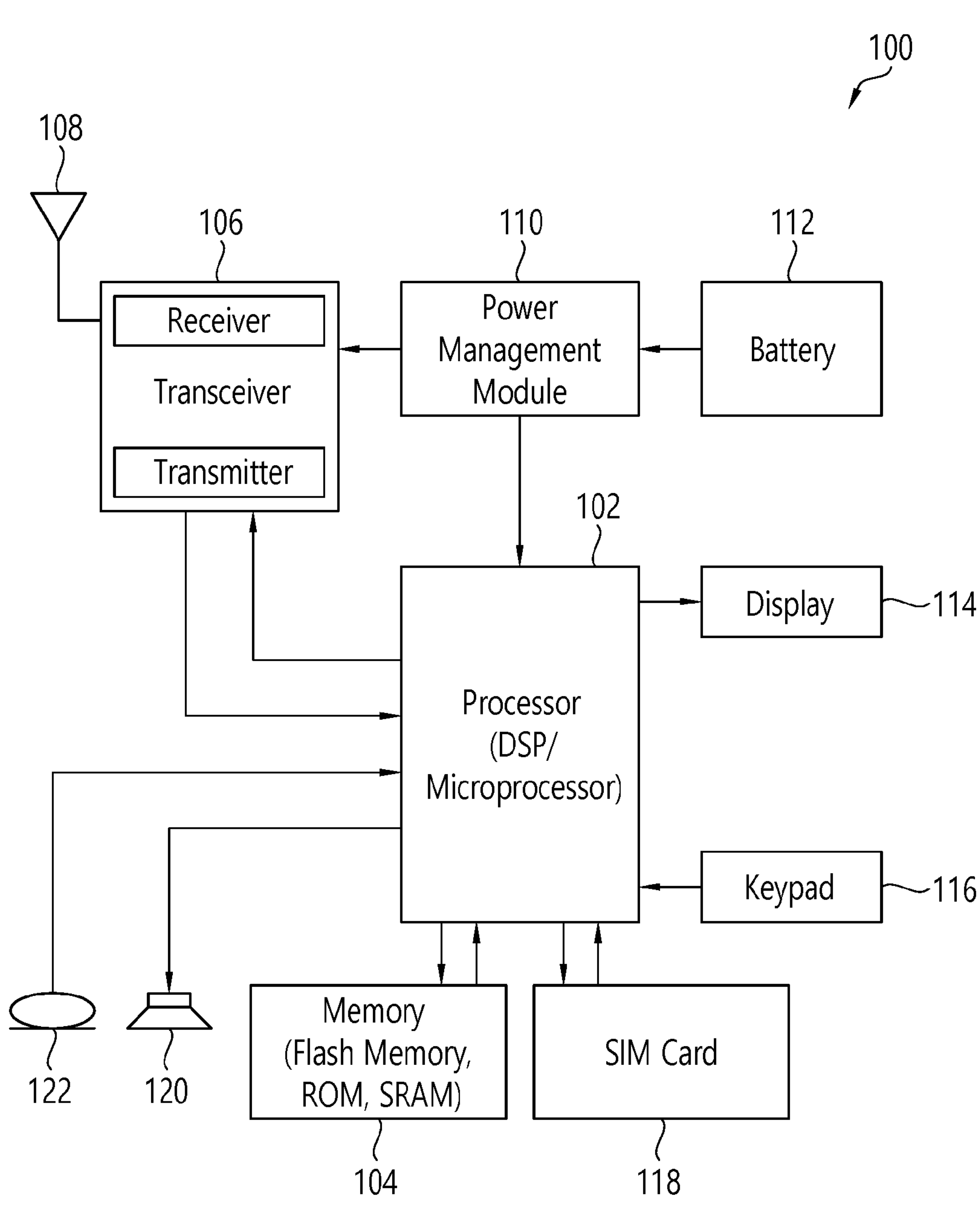

[Fig. 5]
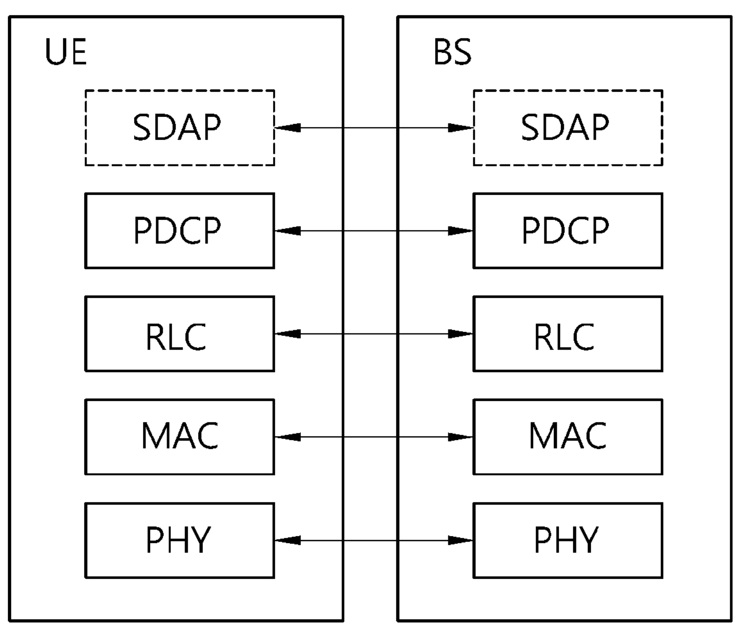
[Fig. 6]
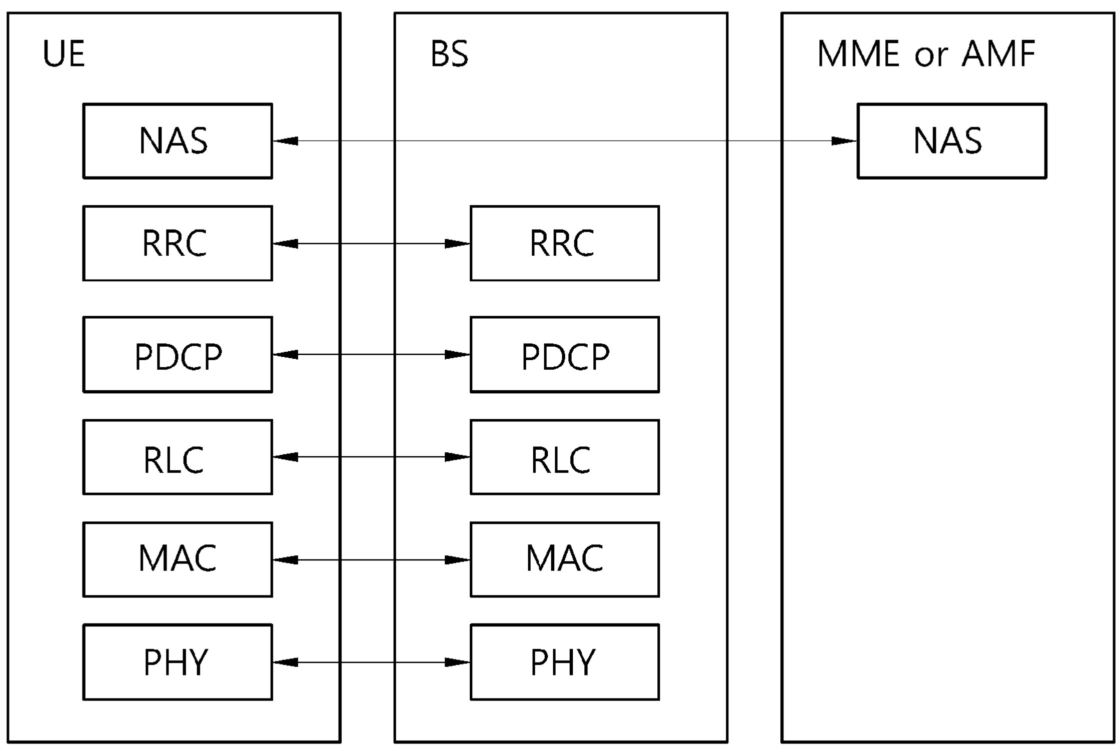

[Fig. 8]
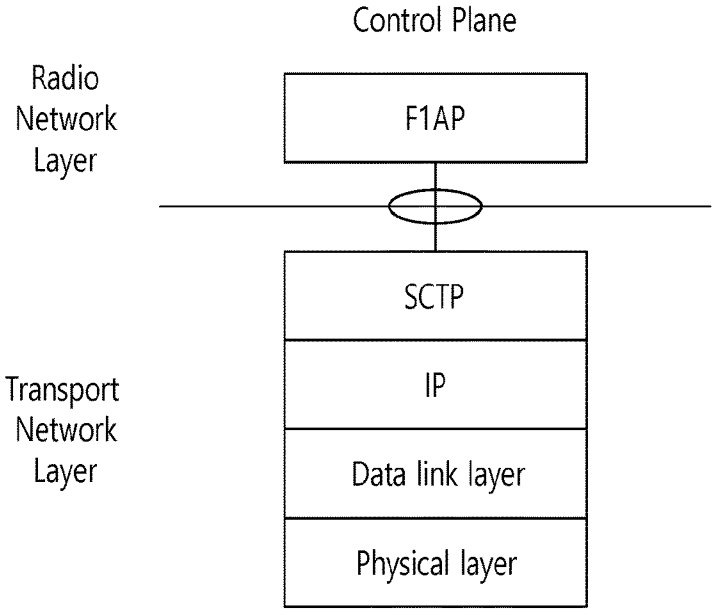
[Fig. 9]
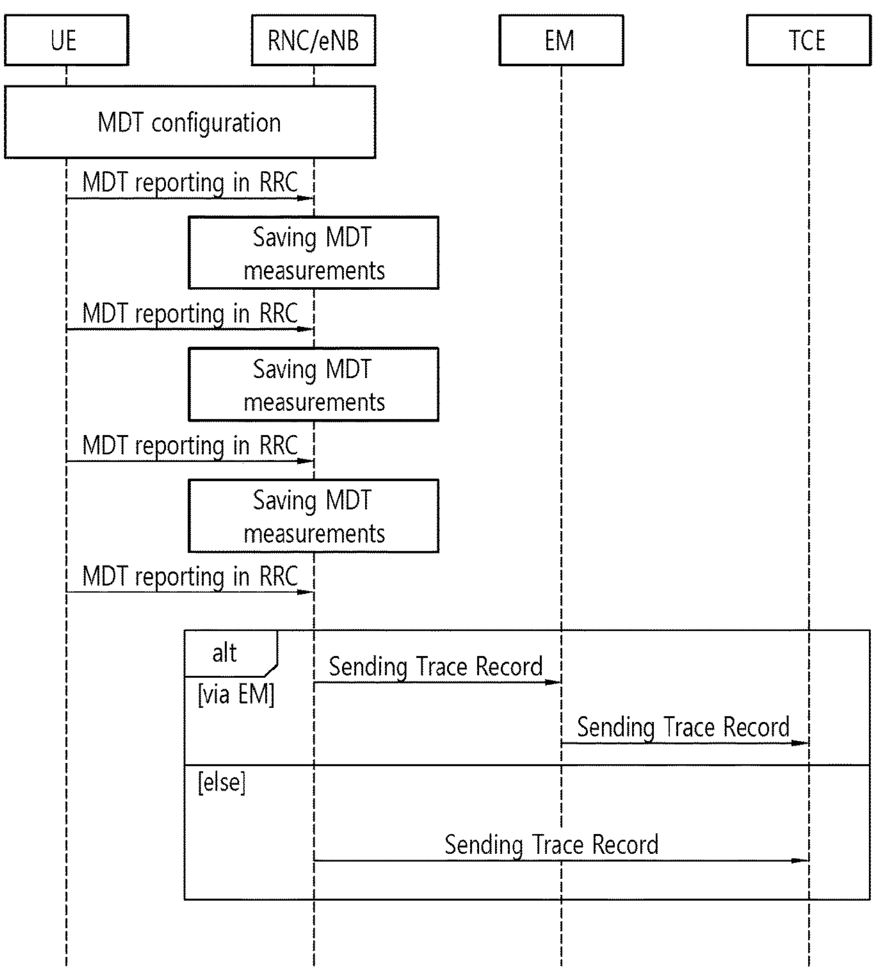

[Fig. 10]
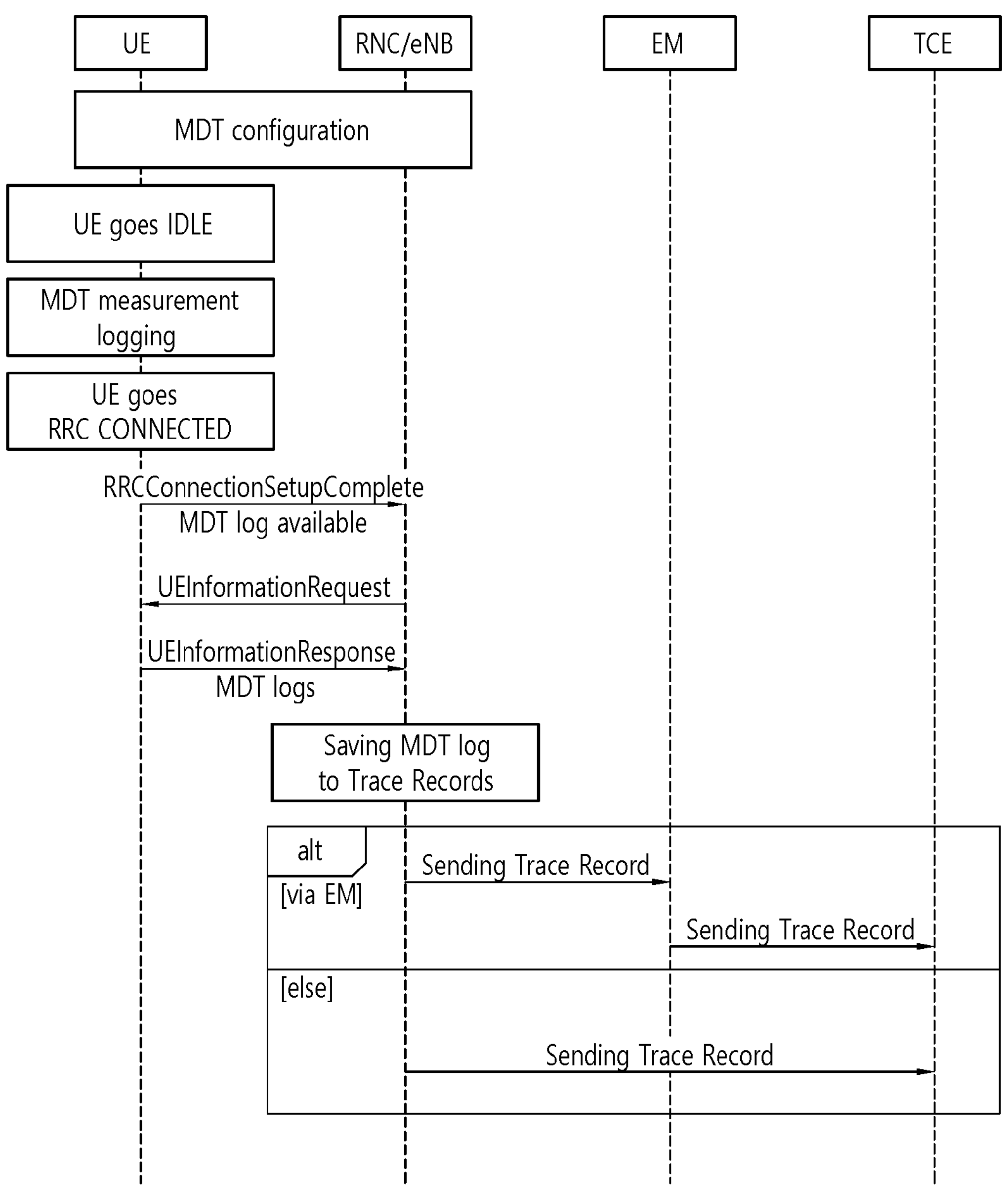

Figure 18:
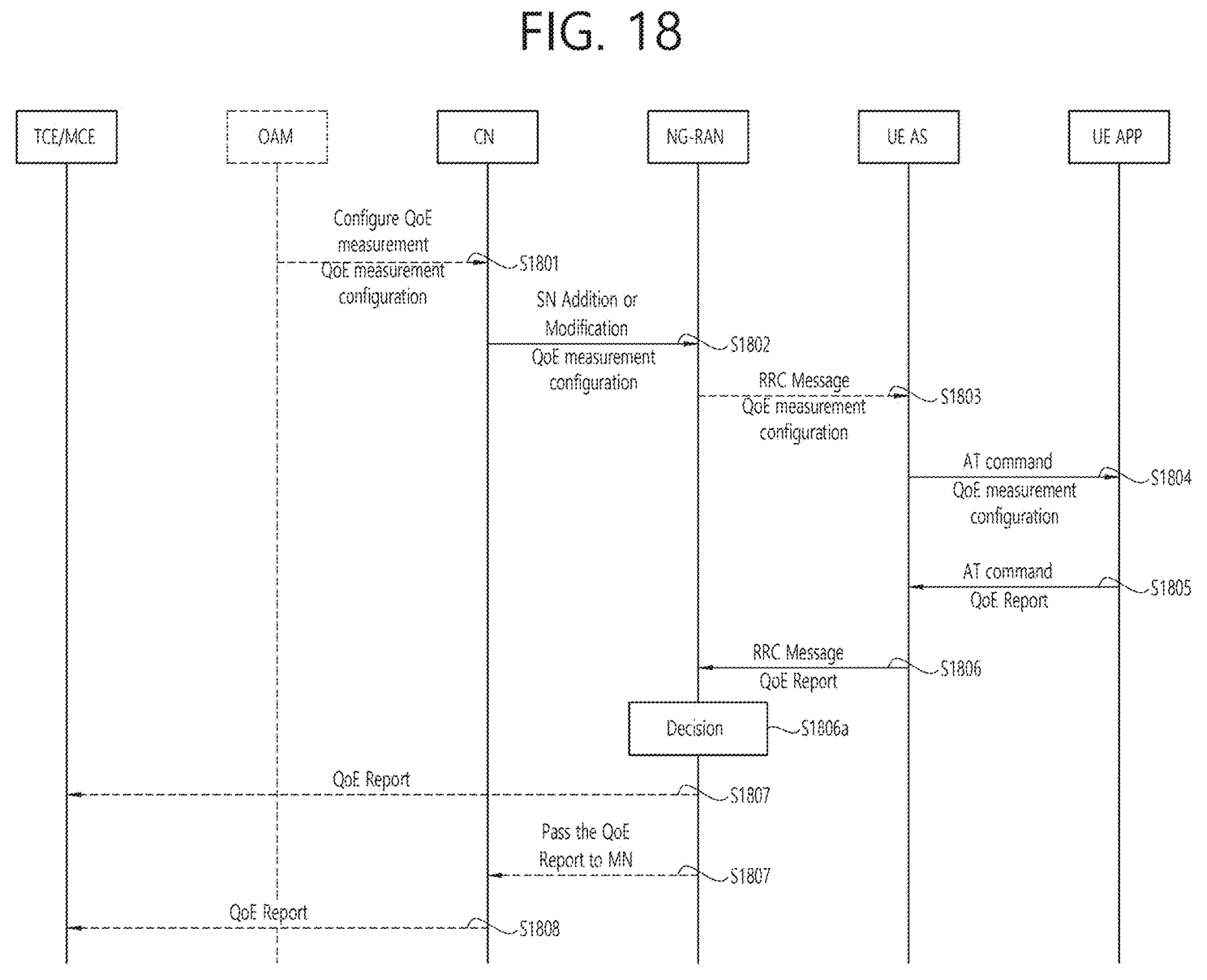

UE APP
UE AS
NG-RAN
CN
OAM
TCE/MCE

S1801 Configure QoE measurement QoE measurement configuration
S1802 SN Addition or Modification QoE measurement configuration
S1803 RRC Message QoE measurement configuration
S1804 AT command QoE measurement configuration
S1805 AT command QoE Report
S1806 RRC Message QoE Report
S1806a Decision
S1807 QoE Report
S1807 Pass the QoE Report to MN
S1808 QoE Report

METHOD AND APPARATUS FOR HANDLING QoE REPORT IN A SECONDARY NODE IN A WIRELESS COMMUNICATION SYSTEM

CROSS-REFERENCE TO RELATED APPLICATIONS

This application is a National Stage application under 35 U.S.C. § 371 of International Application No. PCT/KR2022/000798, filed on Jan. 17, 2022, which claims the benefit of Korean Patent Application No. 10-2021-0052630, filed on Apr. 22, 2021. The disclosures of the prior applications are hereby incorporated by reference in their entirety.

TECHNICAL FIELD

The present disclosure relates to a method and apparatus for handling QoE report in a secondary node in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

SUMMARY

In 5G network, RAN node needs to support adaptive QoE management mechanism for the various services. The QoE services may also be supported for MR-DC, which is important feature in 5G network.

For support of MR-DC, flexible QoE configuration/reporting may be done by either the MN or the SN. If both configure the UE on QoE, the conflict may happen. Thus the negotiation or coordination may be needed between MN and SN.

On the other hand, SN may trigger the management based QoE measurement directly based on the configuration from Operations, Administration and Maintenance (OAM). Thus, there could be some misunderstanding when SN receives the report to UE on how to handle the report.

Therefore, studies for handling QoE report in a secondary node in a wireless communication system are needed.

In an aspect, a method performed by a secondary node (SN) in a wireless communication system is provided. An SN transmits, to a UE, a configuration for Quality of Experience (QoE) measurement. The QoE measurement is initiated by an Operations, Administration and Maintenance (OAM) and/or a master node (MN). An SN receives, from the UE, a QoE report based on the configuration. An SN determines whether to forward the QoE report to (i) a Trace Collection Entity (TCE) and/or a Measurement Collection Entity (MCE) and/or (ii) the MN, based on which entity among the OAM and/or the MN initiates the QoE measurement. An SN forwards the QoE report based on the determination.

In another aspect, an apparatus for implementing the above method is provided.

The present disclosure may have various advantageous effects.

According to some embodiments of the present disclosure, a secondary node could efficiently handle QoE reporting.

For example, a secondary node could prevent from confusing or misunderstanding on how to handle the report, when the secondary node receives the report from UE, since the secondary node may trigger the management based QoE measurement directly based on the configuration from OAM.

This will be helpful for supporting the QoE services in the important MR-DC deployment scenarios. Therefore, the user experience for various services, for example, AR/VR, URLLC, can be enhanced.

For example, a secondary node could efficiently determine whether to forward the QoE report to (i) a Trace Collection Entity (TCE) and/or a Measurement Collection Entity (MCE), and/or (ii) the MN, based on which entity among the OAM and/or the MN initiates the QoE measurement efficiently.

Therefore, the QoE reporting in dual connectivity could be performed without error.

According to some embodiments of the present disclosure, the wireless communication system could handle QoE reporting efficiently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

BRIEF DESCRIPTION OF DRAWINGS

FIG. 1 shows an example of a communication system to which implementations of the present disclosure is applied.

FIG. 2 shows an example of wireless devices to which implementations of the present disclosure is applied.

FIG. 3 shows an example of a wireless device to which implementations of the present disclosure is applied.

FIG. 4 shows an example of UE to which implementations of the present disclosure is applied.

FIGS. 5 and 6 show an example of protocol stacks in a 3GPP based wireless communication system to which implementations of the present disclosure is applied.

FIG. 8 shows an interface protocol structure for F1-C to which technical features of the present disclosure can be applied.

FIG. 9 shows an example of a procedure for immediate Minimization of Drive Tests (MDT) reporting to which technical features of the present disclosure can be applied.

FIG. 10 shows an example of a procedure for MDT reporting in case of Logged MDT to which technical features of the present disclosure can be applied.

FIG. 18 shows an example of a method for reporting QoE measurement results by SN.

DETAILED DESCRIPTION

Figure 7:
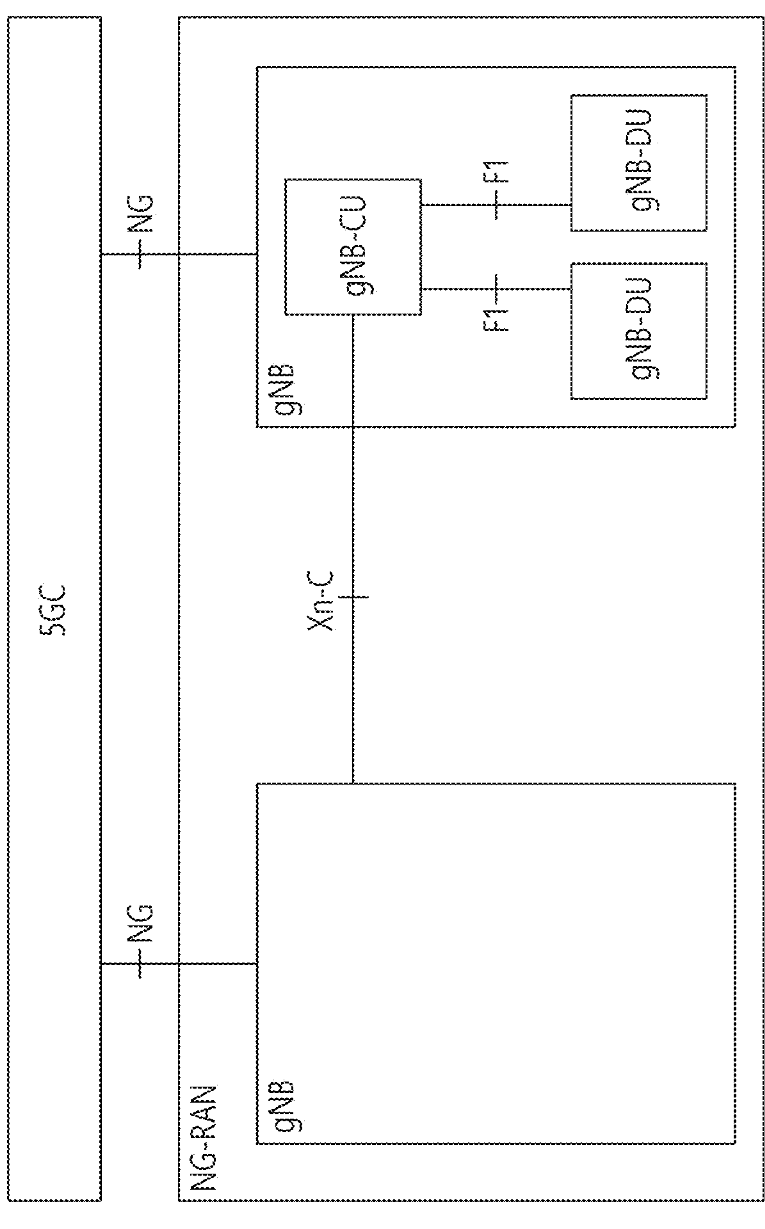
FIG. 7 shows an example of the overall architecture of an NG-RAN to which technical features of the present disclosure can be applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDCCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified.

Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100*a* to 100*f*, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100*a* to 100*f* represent devices performing communication using radio access technology (RAT) (e.g., 5G new RAT (NR)) or LTE) and may be referred to as communication/radio/5G devices. The wireless devices 100*a* to 100*f* may include, without being limited to, a robot 100*a*, vehicles 100*b*-1 and 100*b*-2, an extended reality (XR) device 100*c*, a hand-held device 100*d*, a home appliance 100*e*, an IoT device 100*f*, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100*a* to 100*f* may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example; a device capable of providing a financial service such as mobile payment. For example, the FinTech device may include a payment device or a point of sales (POS) system.

The weather/environment device may include, for example, a device for monitoring or predicting a weather/environment.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, a 5G (e.g., NR) network, and a beyond-5G network. Although the wireless devices 100*a* to 100*f* may communicate with each other through the BSs 200/network 300, the wireless devices 100*a* to 100*f* may perform direct communication (e.g., sidelink communication) with each other without passing through the BSs 200/network 300. For example, the vehicles 100*b*-1 and 100*b*-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b* and 150*c* may be established between the wireless devices 100*a* to 100*f* and/or between wireless device 100*a* to 100*f* and BS 200 and/or between BSs 200. Herein, the wireless communication/connections may be established through various RATs (e.g., 5G NR) such as uplink/downlink communication 150*a*, sidelink communication (or device-to-device (D2D) communication) 150*b*, inter-base station communication 150*c* (e.g., relay, integrated access and backhaul (IAB)), etc. The wireless devices 100*a* to 100*f* and the BSs 200/the wireless devices 100*a* to 100*f* may transmit/receive radio signals to/from each other through the wireless communication/connections 150*a*, 150*b* and 150*c*. For example, the wireless communication/connections 150*a*, 150*b* and 150*c* may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

AI refers to the field of studying artificial intelligence or the methodology that can create it, and machine learning refers to the field of defining various problems addressed in the field of AI and the field of methodology to solve them. Machine learning is also defined as an algorithm that increases the performance of a task through steady experience on a task.

Robot means a machine that automatically processes or operates a given task by its own ability. In particular, robots with the ability to recognize the environment and make self-determination to perform actions can be called intelligent robots. Robots can be classified as industrial, medical, home, military, etc., depending on the purpose or area of use. The robot can perform a variety of physical operations, such as moving the robot joints with actuators or motors. The movable robot also includes wheels, brakes, propellers, etc., on the drive, allowing it to drive on the ground or fly in the air.

Autonomous driving means a technology that drives on its own, and autonomous vehicles mean vehicles that drive without user's control or with minimal user's control. For example, autonomous driving may include maintaining lanes in motion, automatically adjusting speed such as adaptive cruise control, automatic driving along a set route, and automatically setting a route when a destination is set. The vehicle covers vehicles equipped with internal combustion engines, hybrid vehicles equipped with internal combustion engines and electric motors, and electric vehicles equipped with electric motors, and may include trains, motorcycles, etc., as well as cars. Autonomous vehicles can be seen as robots with autonomous driving functions.

Extended reality is collectively referred to as VR, AR, and MR. VR technology provides objects and backgrounds of real world only through computer graphic (CG) images. AR technology provides a virtual CG image on top of a real object image. MR technology is a CG technology that combines and combines virtual objects into the real world. MR technology is similar to AR technology in that they show real and virtual objects together. However, there is a difference in that in AR technology, virtual objects are used as complementary forms to real objects, while in MR technology, virtual objects and real objects are used as equal personalities.

NR supports multiples numerologies (and/or multiple subcarrier spacings (SCS)) to support various 5G services. For example, if SCS is 15 kHz, wide area can be supported in traditional cellular bands, and if SCS is 30 kHz/60 kHz, dense-urban, lower latency, and wider carrier bandwidth can be supported. If SCS is 60 kHz or higher, bandwidths greater than 24.25 GHz can be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR).

In FIG. 2, {the first wireless device 100 and the second wireless device 200} may correspond to at least one of {the wireless device 100*a* to 100*f* and the BS 200}, {the wireless device 100*a* to 100*f* and the wireless device 100*a* to 100*f*} and/or {the BS 200 and the BS 200} of FIG. 1.

The first wireless device 100 may include at least one transceiver, such as a transceiver 106, at least one processing chip, such as a processing chip 101, and/or one or more antennas 108.

The processing chip 101 may include at least one processor, such a processor 102, and at least one memory, such as a memory 104. It is exemplarily shown in FIG. 2 that the memory 104 is included in the processing chip 101. Additional and/or alternatively, the memory 104 may be placed outside of the processing chip 101.

The processor 102 may control the memory 104 and/or the transceiver 106 and may be configured to implement the descriptions, functions, procedures, suggestions, methods and/or operational flowcharts described in the present disclosure. For example, the processor 102 may process information within the memory 104 to generate first information/signals and then transmit radio signals including the first information/signals through the transceiver 106. The processor 102 may receive radio signals including second information/signals through the transceiver 106 and then store information obtained by processing the second information/signals in the memory 104.

The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 to perform one or more layers of the radio interface protocol.

Herein, the processor 102 and the memory 104 may be a part of a communication modem/circuit/chip designed to implement RAT (e.g., LTE or NR). The transceiver 106 may be connected to the processor 102 and transmit and/or receive radio signals through one or more antennas 108. Each of the transceiver 106 may include a transmitter and/or a receiver. The transceiver 106 may be interchangeably used with radio frequency (RF) unit(s). In the present disclosure, the first wireless device 100 may represent a communication modem/circuit/chip.

The second wireless device 200 may include at least one transceiver, such as a transceiver 206, at least one processing chip, such as a processing chip 201, and/or one or more antennas 208.

The processing chip 201 may include at least one processor, such a processor 202, and at least one memory, such as a memory 204. It is exemplarily shown in FIG. 2 that the memory 204 is included in the processing chip 201. Additional and/or alternatively, the memory 204 may be placed outside of the processing chip 201.

The processor 202 may control the memory 204 and/or the transceiver 206 and may be configured to implement the descriptions, functions, procedures, suggestions, methods and/or operational flowcharts described in the present disclosure. For example, the processor 202 may process information within the memory 204 to generate third information/signals and then transmit radio signals including the third information/signals through the transceiver 206. The processor 202 may receive radio signals including fourth information/signals through the transceiver 106 and then store information obtained by processing the fourth information/signals in the memory 204.

The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 to perform one or more layers of the radio interface protocol.

Herein, the processor 202 and the memory 204 may be a part of a communication modem/circuit/chip designed to implement RAT (e.g., LTE or NR). The transceiver 206 may be connected to the processor 202 and transmit and/or receive radio signals through one or more antennas 208. Each of the transceiver 206 may include a transmitter and/or a receiver. The transceiver 206 may be interchangeably used with RF unit. In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100*a* of FIG. 1), the vehicles (100*b*-1 and 100*b*-2 of FIG. 1), the XR device (100*c* of FIG. 1), the hand-held device (100*d* of FIG. 1), the home appliance (100*e* of FIG. 1), the IoT device (100*f* of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

FIG. 4 shows an example of UE to which implementations of the present disclosure is applied.

Referring to FIG. 4, a UE 100 may correspond to the first wireless device 100 of FIG. 2 and/or the wireless device 100 or 200 of FIG. 3.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

FIGS. 5 and 6 show an example of protocol stacks in a 3GPP based wireless communication system to which implementations of the present disclosure is applied.

In particular, FIG. 5 illustrates an example of a radio interface user plane protocol stack between a UE and a BS and FIG. 6 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 5, the user plane protocol stack may be divided into Layer 1 (i.e., a PHY layer) and Layer 2. Referring to FIG. 6, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

FIG. 7 shows an example of the overall architecture of an NG-RAN to which technical features of the present disclosure can be applied.

Referring to FIG. 7, a gNB may include a gNB-CU (hereinafter, gNB-CU may be simply referred to as CU) and at least one gNB-DU (hereinafter, gNB-DU may be simply referred to as DU).

The gNB-CU is a logical node hosting RRC, SDAP and PDCP protocols of the gNB or an RRC and PDCP protocols of the en-gNB. The gNB-CU controls the operation of the at least one gNB-DU.

The gNB-DU is a logical node hosting RLC, MAC, and physical layers of the gNB or the en-gNB. The operation of the gNB-DU is partly controlled by the gNB-CU. One gNB-DU supports one or multiple cells. One cell is supported by only one gNB-DU.

The gNB-CU and gNB-DU are connected via an F1 interface. The gNB-CU terminates the F1 interface connected to the gNB-DU. The gNB-DU terminates the F1 interface connected to the gNB-CU. One gNB-DU is connected to only one gNB-CU. However, the gNB-DU may be connected to multiple gNB-CUs by appropriate implementation. The F1 interface is a logical interface. For NG-RAN, the NG and Xn-C interfaces for a gNB consisting of a gNB-CU and gNB-DUs, terminate in the gNB-CU. For E-UTRAN-NR dual connectivity (EN-DC), the S1-U and X2-C interfaces for a gNB consisting of a gNB-CU and gNB-DUs, terminate in the gNB-CU. The gNB-CU and connected gNB-DUs are only visible to other gNBs and the 5GC as a gNB.

FIG. 8 shows an interface protocol structure for F1-C to which technical features of the present disclosure can be applied.

A transport network layer (TNL) is based on Internet protocol (IP) transport, comprising a stream control transmission protocol (SCTP) layer on top of the IP layer. An application layer signaling protocol is referred to as an F1 application protocol (E1AP).

FIG. 9 shows an example of a procedure for immediate Minimization of Drive Tests. (MDT) reporting to which technical features of the present disclosure can be applied.

In case of Immediate MDT, the MDT related measurements are sent in RRC as part of the existing RRC measurements. Whenever the eNB/RNC receives the MDT measurements it shall save it to a Trace Record. The Trace Records are sent to the TCE either directly or via EM (where EM can reside in the eNB/RNC).

The time and the criteria when the Trace Records are sent to the TCE is vendor specific however if the Trace Session is deactivated, the Trace Records shall be sent to the TCE latest by 2 hours (the exact time is FFS) after the Trace Session deactivation.

For reporting of MDT data in single operator and participating operator cases.

Referring to FIG. 9, UE may receive MDT configuration from a Radio Network Controller (RNC) or an eNB.

UE may transmit, to the RNC or the eNB, MDT reporting in RRC. The RNC or the eNB may save the MDT measurements.

For example, the RNC or the eNB may send Trace Record to the Element Manager (EM). The EM may send Trace Record to Trace Collection Entity (TCE).

For other example, the RNC or the eNB may send Trace Record to Trace Collection Entity (TCE).

FIG. 10 shows an example of a procedure for MDT reporting in case of Logged MDT to which technical features of the present disclosure can be applied.

In case of Logged MDT, the UE collects the measurements while it is in IDLE mode. Once the UE goes to RRC CONNECTED mode, the UE indicates MDT log availability in the RRCConnectionSetupComplete message to the eNB/RNC. When the eNB/RNC receives this indication it can request the MDT log (if the UE is still in the same RAT type where the MDT configuration was done) by sending the UEInformationRequest message to the UE. The MDT logs are sent to the network in the UEInformationResponse message. At the reception of the UEInformationResponse message the eNB/RNC shall save the received MDT log to the Trace Record. The Trace Records are sent to the TCE either directly or via EM (where EM can reside in the eNB/RNC).

The time and criteria when the Trace Records are sent to the TCE is vendor specific however if the Trace Session is deactivated, the Trace Records shall be sent to the TCE latest by 2 hours (the exact time is FFS) after the Trace Session deactivation.

Referring to FIG. 10, UE may receive MDT configuration from a Radio Network Controller (RNC) or an eNB.

UE may go into IDLE.

UE may perform MDT measurement logging.

UE may go into RRC_CONNECTED.

UE may transmit, to the RNC or the eNB, RRC Connection Setup Complete message informing that MDT log is available.

UE may receive, from the RNC or the eNB, UE information Request.

UE may transmit, to the RNC or the eNB, UE information response including MDT logs.

The RNC or the eNB may save the MDT log to Trace Records.

For example, the RNC or the eNB may send Trace Record to the Element Manager (EM). The EM may send Trace Record to Trace Collection Entity (TCE).

For other example, the RNC or the eNB may send Trace Record to Trace Collection Entity (TCE).

Figure 11:
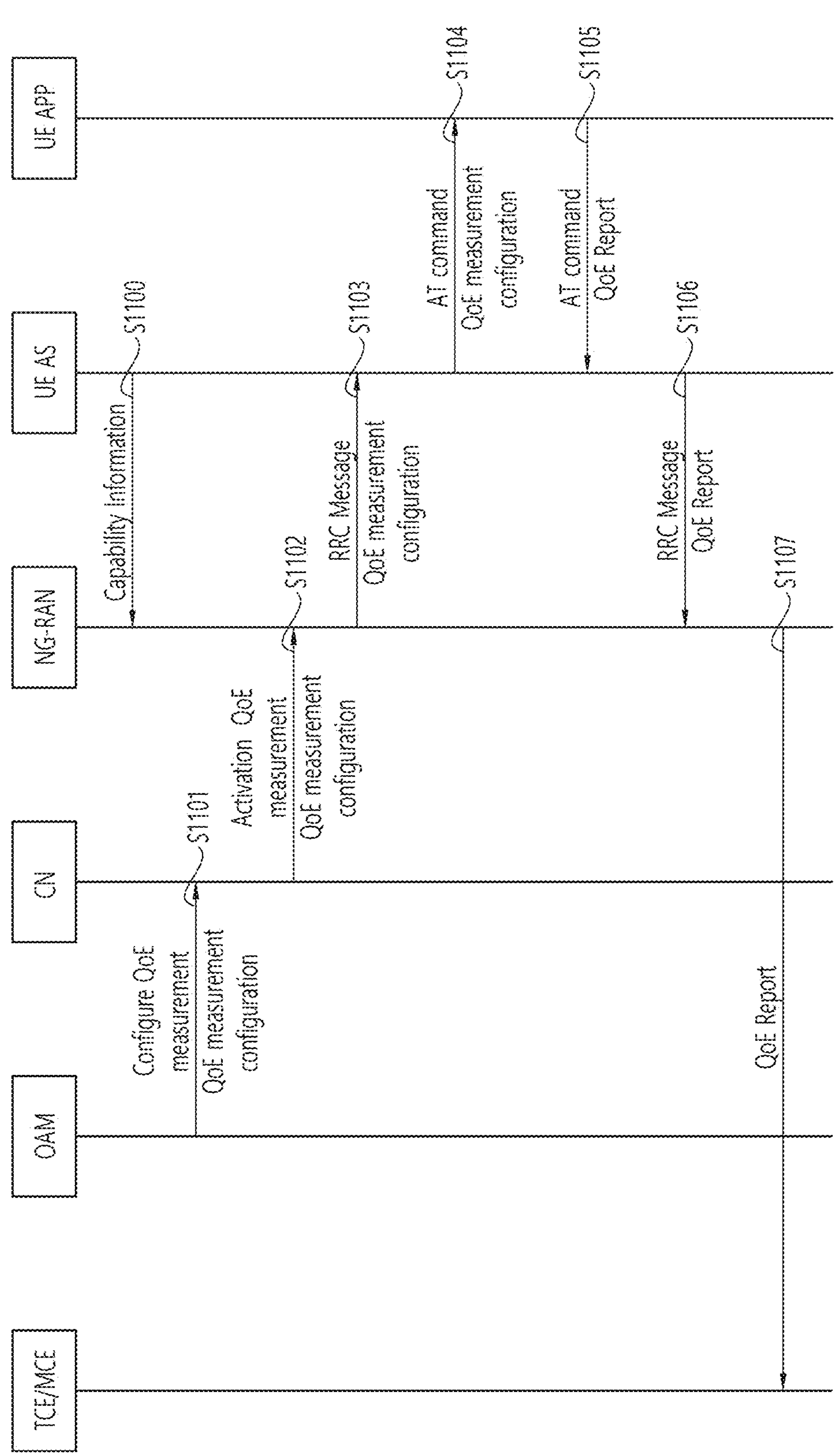
FIG. 11 shows an example of signalling-based NR QoE activation procedure to which technical features of the present disclosure can be applied.

FIG. 11 shows an example of signalling-based NR QoE activation procedure to which technical features of the present disclosure can be applied.

The procedure is used for activating the QoE measurement configured by OAM and triggered by CN.

In step S1100, the UE AS mat transmit, to the NG-RAN, capability information.

In step S1101, the OAM may configure QoE measurement and transmit, to the Core Network (CN), QoE measurement configuration.

In step S1102, the CN may initiate the activation of the QoE measurement configured by OAM, and send the QoE measurement configuration to the NG-RAN node.

In step S1103, the NG-RAN node may transmit, to UE AS, an RRC message including the QoE measurement configuration.

In step S1104, UE AS layer may send the QoE measurement configuration to UE application layer.

Configuration and Reporting for multiple simultaneous QoE measurements for a UE can be supported.

In step S1105, UE application layer may generate the QoE report and send it to the UE AS layer.

In step S1106, UE AS layer may send the QoE report to NG-RAN node via a separate SRB (separate from current SRBs) in NR, as this reporting is lower priority than other SRB transmissions.

In step S1107, the NG-RAN node may transmit the QoE report to the final destination configured (for example, TCE/MCE).

RRC segmentation may be needed for transmission of QoE reports, and any potential solutions need detailed technical specification of the procedures.

Management based QoE configuration should not override signalling based QoE configuration.

Figure 12:
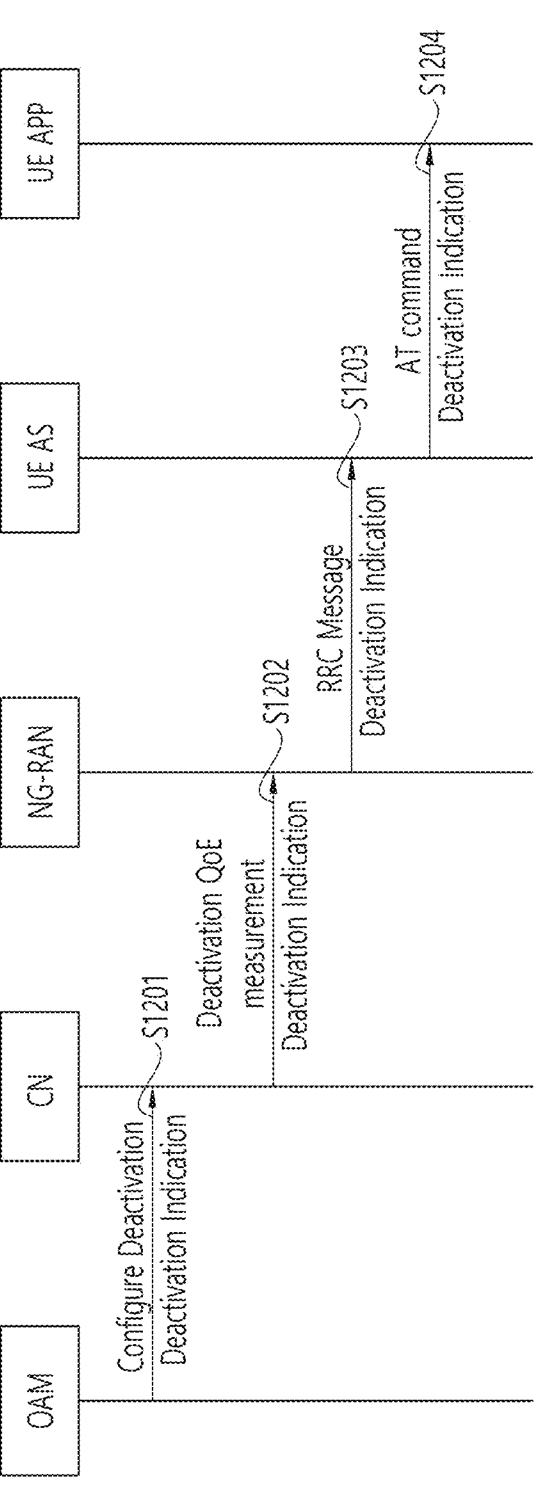
FIG. 12 shows an example of signalling-based NR QoE deactivation procedure to which technical features of the present disclosure can be applied.

FIG. 12 shows an example of signalling-based NR QoE deactivation procedure to which technical features of the present disclosure can be applied.

The procedure may be used for deactivating the QoE measurement configured by OAM and triggered by CN.

In step S1201, the OAM may configure deactivation of QoE measurement and transmit deactivation indication to the CN.

In step S1202, the CN may initiate the deactivation of QoE measurement, as configured by OAM, and send the deactivation indication to the NG-RAN node to indicate which QoE measurement should be deactivated.

In step S1203, the NG-RAN node may send the deactivation indication to the UE AS layer.

In step S1204, the UE AS layer may send the deactivation indication to the UE application layer.

Figure 13:
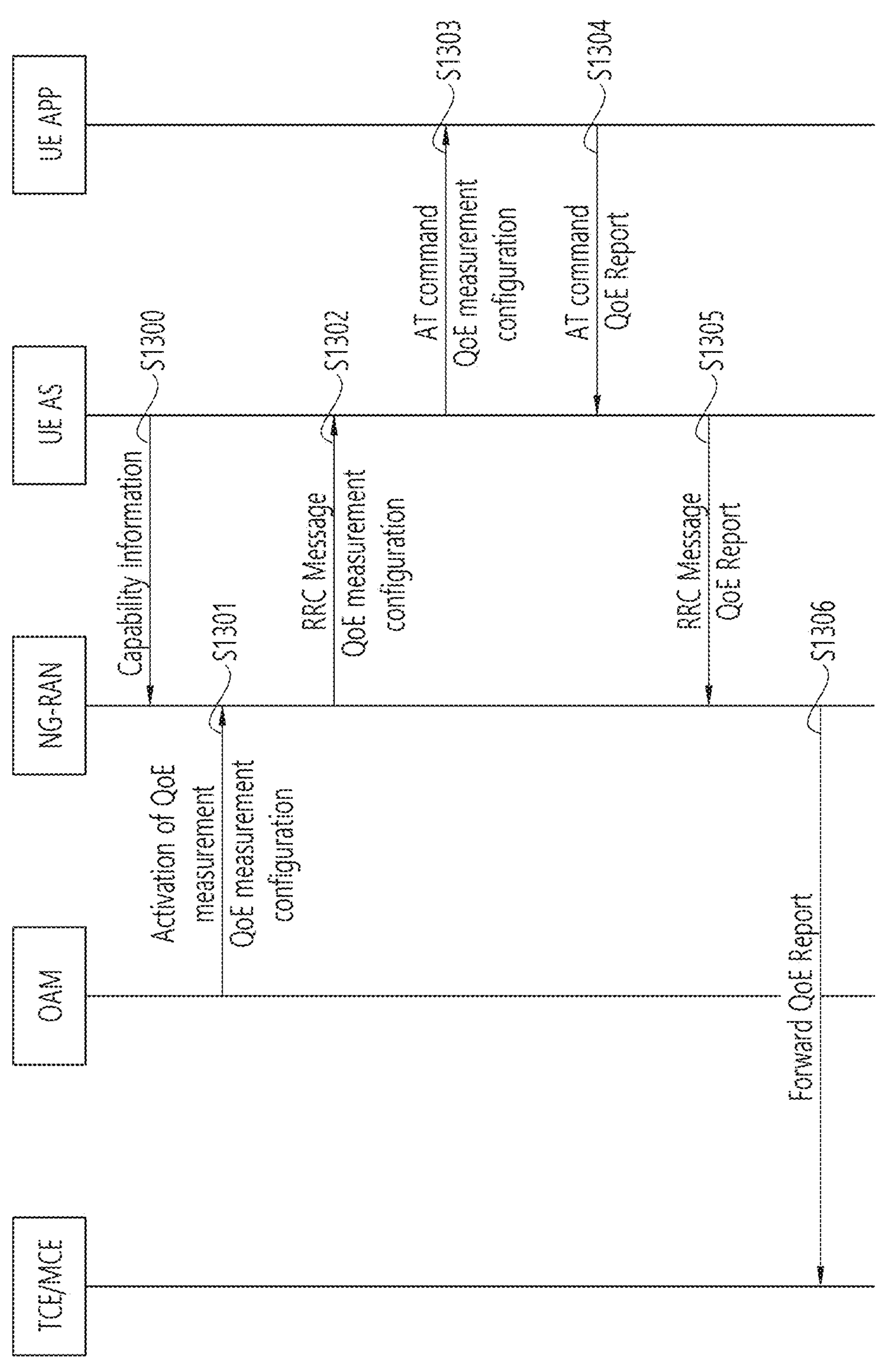
FIG. 13 shows an example of management-based NR QoE activation procedure to which technical features of the present disclosure can be applied.

FIG. 13 shows an example of management-based NR QoE activation procedure to which technical features of the present disclosure can be applied.

The procedure is used for activating the QoE measurement configured and triggered by OAM.

In step S1300, the UE AS mat transmit, to the NG-RAN, capability information.

In step S1301, the OAM may send the QoE measurement configuration to NG-RAN node.

NG-RAN finds multiple qualified UEs that meet the criteria (for example, area scope, application layer capability, service type, etc.) or a single specific UE.

In step S1302, NG-RAN node may send the QoE measurement configuration to the AS layer of the specific UE or each qualified UE.

In step S1303, UE AS layer may send the QoE measurement configuration to UE application layer.

When a session starts, the application layer in UE may check the criteria (e.g. cell list, service type, etc.). If the criteria are met, the application layer in UE may start QoE measurement and reporting.

Configuration and Reporting for multiple simultaneous QoE measurements for a UE can be supported.

In case multiple QoE measurements are configured at a UE, it can be discussed in the normative phase whether one measurement is configured per service type at the UE.

In step S1304, UE application layer may send the QoE report to the UE AS layer.

In step S1305, UE AS layer may send the QoE report to NG-RAN node via a separate SRB (separate from current SRBs) in NR, as this reporting is lower priority than other SRB transmissions.

In step S1306, the NG-RAN node may transmit the QoE report to the final destination configured (e.g. the MCE).

RRC segmentation may be needed for transmission of QoE reports, and any potential solutions need detailed technical specification of the procedures.

Management based QoE configuration should not override signalling based QoE configuration.

Regarding Management-based configuration towards an individual specific UE, the following needs to be considered:

- The OAM is currently not capable of sending the QoE measurement configuration for a specific UE towards its serving gNB when the targeted UE becomes RRC_CONNECTED. This is because OAM is not informed about when a specific UE served by a certain gNB become RRC_CONNECTED.
- There is currently no UE identifier available in OAM which can be used to identify an UE connected to a certain gNB.
- Although it is acknowledged that QoE measurement configuration towards an individual specific UE is already possible using signalling based configuration (via the CN), it should be noted that OAM can issue per-user policies for which the feedback in terms of user experience is required.

Figure 14:
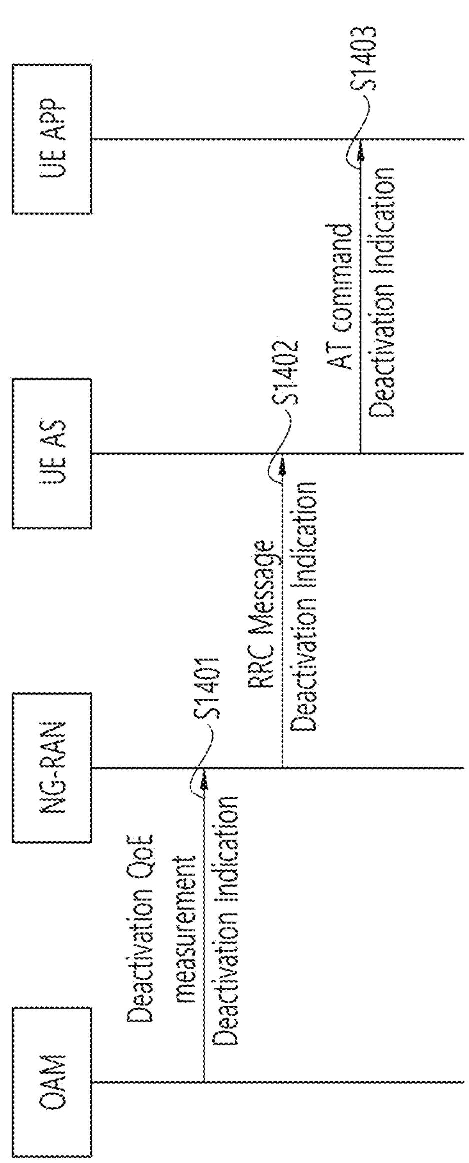
FIG. 14 shows an example of management-based NR QoE deactivation procedure to which technical features of the present disclosure can be applied.

FIG. 14 shows an example of management-based NR QoE deactivation procedure to which technical features of the present disclosure can be applied.

The procedure may be used for deactivating the QoE measurement triggered by OAM.

In step S1401, OAM may send the deactivation indication to NG-RAN node to indicate which QoE measurement should be deactivated.

In step S1402, if the NG-RAN node receives the indication that the QoE measurement configuration is to be deactivated, then NG-RAN node may send the deactivation indication to the UE AS layer.

In step S1403, the UE AS layer may send it to the application layer in UE.

Meanwhile, in Universal Terrestrial Radio Access Network UTRAN and Evolved-UTRAN (E-UTRAN), Quality of Experience (QoE) Measurement Collection for streaming services have been specified. NR is designed for different kinds of services and scenarios, and operators have strong demand to optimize their network and provide better user experiences with various types of services.

QoE management in 5G will not just collect the experience parameters of streaming services but also consider the typical performance requirements of diverse services (for example, AR/VR and URLLC). Based on requirements of services, adaptive QoE management schemes that enable network intelligent optimization to satisfy user experience for diverse services are studied.

5G network will provide service for various kinds of vertical industries and various kinds of users, the 5QI service requirements may not enough to provide good user experience for all the user requirements. Thus in the 5G network, RAN also needs to collect the user KPI information, for example, E2E reliability statistic indicator, etc.

Different types of UEs have different QoE requirements, resource allocation should be based on the UE's requirements. QoE parameters can be defined as UE-specific and service related. In addition, QoE can be used as a criteria to evaluate network quality.

During NR QoE SI phase, it needs to study the generic mechanisms of trigger, configuration and reporting for QoE measurement collection, including all relevant entities (for example, UE, network entities). In addition, the mechanisms need to support 5G existing services as well as scalable support for new emerging services in the future.

As described above, in 5G network, RAN node needs to support adaptive QoE management mechanism for the various services. The QoE services may also be supported for MR-DC, which is important feature in 5G network.

For support of MR-DC, flexible QoE configuration/reporting may be done by either the MN or the SN. If both configure the UE on QoE, the conflict may happen. Thus the negotiation or coordination may be needed between MN and SN.

On the other hand, SN may trigger the management based QoE measurement directly based on the configuration from Operations, Administration and Maintenance (OAM). Thus, there could be some misunderstanding when SN receives the report to UE on how to handle the report.

Therefore, studies for handling QoE report in a secondary node in a wireless communication system are needed.

Hereinafter, a method for handling QoE report in a secondary node in a wireless communication system, according to some embodiments of the present disclosure, will be described.

Figure 15:
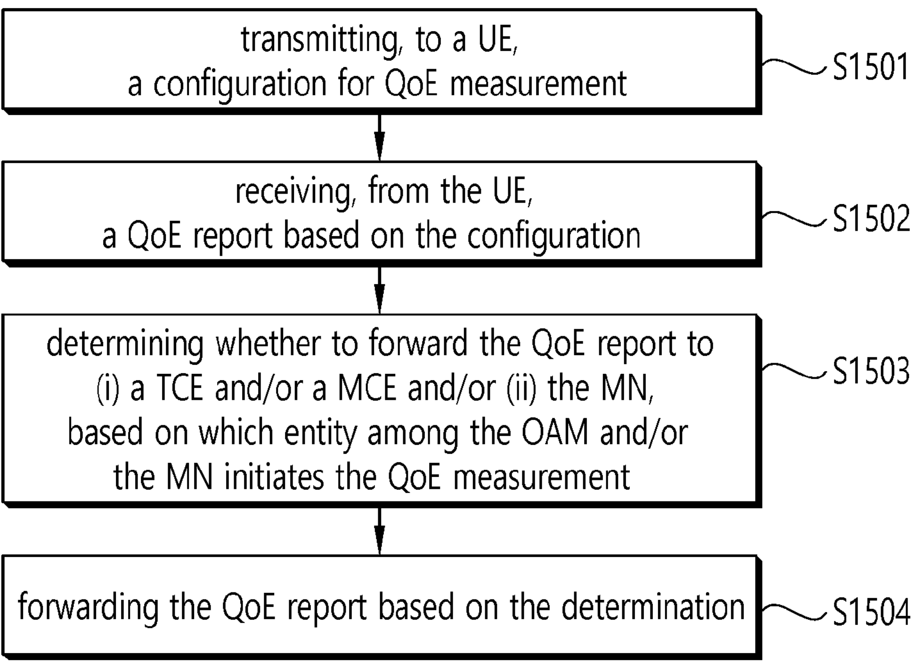
FIG. 15 shows an example of a method for handling QoE report in a secondary node in a wireless communication system, according to some embodiments of the present disclosure.

FIG. 15 shows an example of a method for handling QoE report in a secondary node in a wireless communication system, according to some embodiments of the present disclosure.

In particular, FIG. 15 shows an example of a method performed by a secondary node (SN) in a wireless communication system. For example, the SN may establish a dual connectivity with a master node for a UE.

In step S1501, the SN may transmit, to a UE, a configuration for Quality of Experience (QoE) measurement. The QoE measurement may be initiated by an Operations, Administration and Maintenance (OAM) and/or a master node (MN).

For example, the OAM may transmit, to the SN, a QoE measurement configuration. The OAM may initiate activation of the QoE measurement for the SN.

For example, the MN may transmit, to the SN, a QoE measurement configuration. The MN may initiate activation of the QoE measurement for the SN. That is, MN may decide to let SN perform the QoE measurement via an SN addition procedure or an SN modification procedure.

For example, both the OAM and the MN may initiate the QoE measurement in the SN. That is, the SN could perform the QoE measurement initiated by the OAM and the QoE measurement initiated by the MN simultaneously.

In step S1502, the SN may receive, from the UE, a QoE report based on the configuration.

For example, the SN may receive, from the UE, a Radio Resource Control (RRC) message including a container. The QoE report may be included in the container.

For example, the QoE report may be transmitted via a Signalling Radio Bearer (SRB).

In step S1503, the SN may determining whether to forward the QoE report to (i) a Trace Collection Entity (TCE) and/or a Measurement Collection Entity (MCE) and/or (ii) the MN, based on which entity among the OAM and/or the MN initiates the QoE measurement; and For example, the QoE report may include an explicit indication or a specific identifier (ID) of the UE. In this case, the SN may determine which entity among the OAM and/or the MN initiates the QoE measurement, based on the specific ID of the UE.

For example, the QoE report includes a QoE service type. In this case, the SN may determine which entity among the OAM and/or the MN initiates the QoE measurement, based on the QoE service type.

In step S1504, the SN may forward the QoE report based on the determination.

For example, the SN may forward the QoE report to the TCE and/or the MCE, based on that the OAM initiates the QoE measurement.

For other example, the SN may forward the QoE report to the MN, based on that the MIN initiates the QoE measurement. In this case, the SN may transmit, to the MN, an Xn message including a container. The QoE report may be included in the container.

For example, the QoE report, received from the UE in step S1503, may include information informing destination of the QoE report. In this case, The SN may forward the QoE report to the destination.

For example, the QoE report, received from the UE in step S1503, may include an internet protocol (IP) address of the TCE and/or the MCE. In this case, the SN may forward the QoE report to the TCE and/or the MCE directly.

According to some embodiments of the present disclosure, the UE may be in communication with at least one of a user equipment, a network, or an autonomous vehicle other than the UE.

Hereinafter, the secondary node (SN) Addition procedure and the SN Modification procedure for handling QoE report may be described. The scheme on how to decide in master node (MN) and trigger the signalling to request SN to do configuration and reporting on QoE service may be proposed. In addition, MN could also decide when and how to release the configuration in SN.

Figure 16:
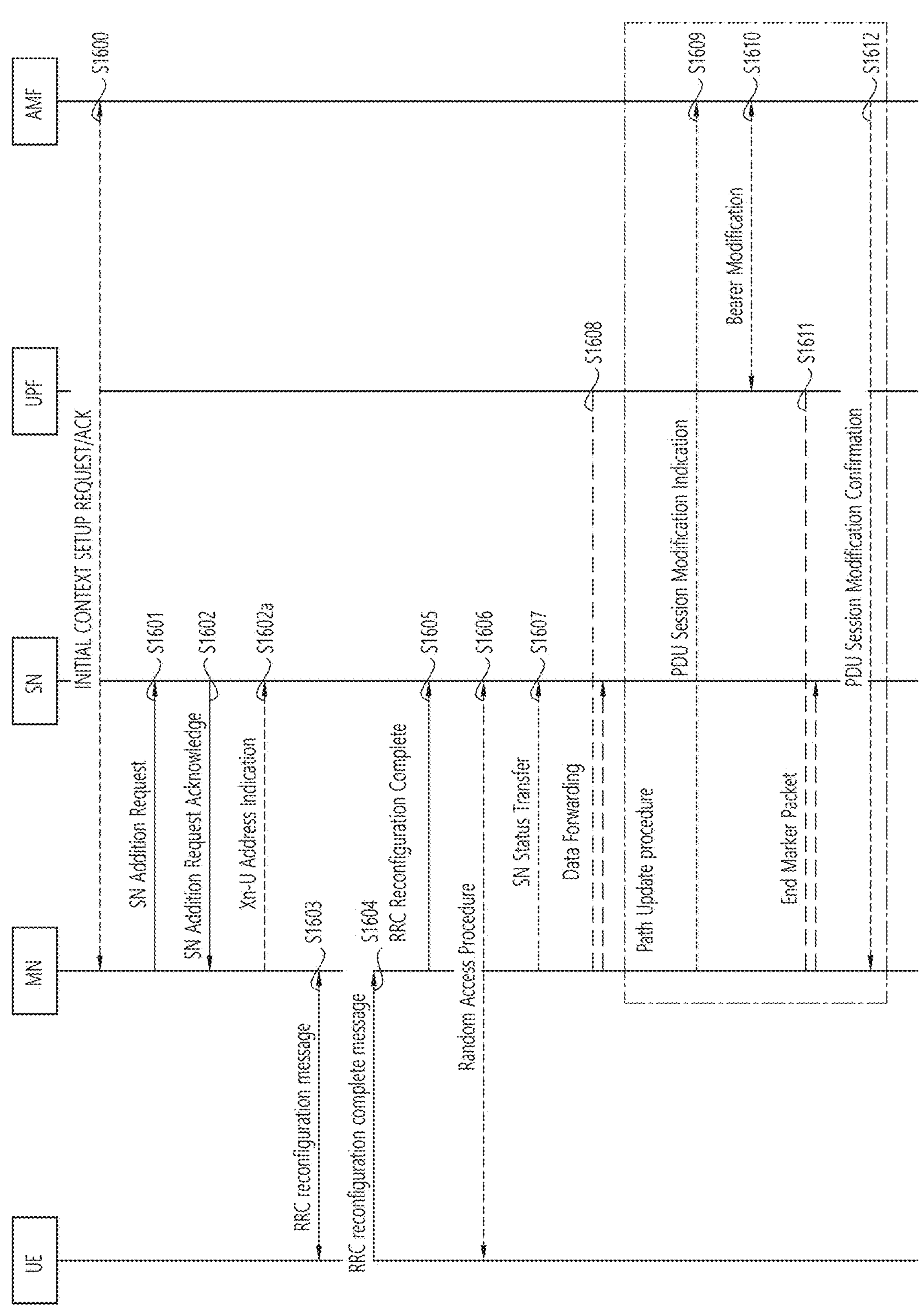
FIG. 16 shows an example of a method for a SN Addition Procedure for QoE Service in a wireless communication system.

FIG. 16 shows an example of a method for a SN Addition Procedure for QoE Service in a wireless communication system. In particular, FIG. 16 illustrates a diagram for triggering QoE service during the SN addition procedure.

The Secondary Node (SN) Addition procedure may be initiated by the MN and be used to establish a UE context at the SN in order to provide resources from the SN to the UE. For bearers requiring SCG radio resources, this procedure may be used to add at least the initial SCG serving cell of the SCG. This procedure can also be used to configure an SN terminated MCG bearer (where no SCG configuration is needed).

Referring to FIG. 16, in step S1600, the MN may transmit an initial context setup request message to the AMF and receive an initial context setup acknowledgement message from the AMF.

In step S1601, the MN may decide to request the target SN to allocate resources for one or more specific PDU Sessions/QoS Flows, indicating QoS Flows characteristics (QoS Flow Level QoS parameters, PDU session level TNL address information, and PDU session level Network Slice info).

In addition, for bearers requiring SCG radio resources, MN may indicate the requested SCG configuration information, including the entire UE capabilities and the UE capability coordination result.

In this case, the MN may also provide the latest measurement results for SN to choose and configure the SCG cell(s). The MN may request the SN to allocate radio resources for split SRB operation.

In NGEN-DC and NR-DC, the MN may always provide all the needed security information to the SN (even if no SN terminated bearers are setup) to enable SRB3 to be setup based on SN decision.

Based on the signalling load or other situation of MN, the MN may decide to let SN help the MN to perform some QoE services for this UE. Thus, the request message (i.e., the SN addition request message) may include the indication(s) of requesting QoE configuration and/or QoE reporting in SN (for example, via existing or other SRB). The S-NG-RAN node may take it into account to configure radio resources for QoE configuration and/or QoE reporting via existing or other SRB.

In step S1602, if the RRM entity in the SN is able to admit the resource request, it may allocate respective radio resources and, dependent on the bearer type options, respective transport network resources.

For bearers requiring SCG radio resources, the SN may trigger UE Random Access so that synchronisation of the SN radio resource configuration can be performed.

The SN may decide for the PSCell and other SCG SCells and provide the new SCG radio resource configuration to the MN within an SN RRC configuration message contained in the SN Addition Request Acknowledge message.

In case of bearer options that require Xn-U resources between the MN and the SN, the SN may provide Xn-U TNL address information for the respective DRB, Xn-U UL TNL address information for SN terminated bearers, Xn-U DL TNL address information for MN terminated bearers. For SN terminated bearers, the SN may provide the NG-U DL TNL address information for the respective PDU Session and security algorithm. If SCG radio resources have been requested, the SCG radio resource configuration may be provided.

Based on the signalling load or other situation of SN, SN can decide whether to accept the request from MN on QoE services for this UE.

The response message (i.e., the SN edition request acknowledge message) may include the response indication (s) on whether the requested QoE configuration and/or QoE reporting in SN (for example, via existing or other SRB) is accepted or not.

If yes (that is, if the QoE request from the MN is accepted by the SN), the requested QoE configuration and QoE reporting will be done in SN. It may include the indication to tell MN and/or it may include the indication and/or information in the RRC context to let UE know that QoE configuration and/or QoE reporting can be directly from/to SN.

If no (that is, if the QoE request from the MN is not accepted by the SN), it includes the indication to tell MN that the requested QoE configuration and/or QoE reporting in SN is not accepted. Thus, MN may need to perform QoE configuration and/or QoE reporting by itself using the existing or other SRB.

In step S1602*a*, for SN terminated bearers using MCG resources, the MN may provide Xn-U DL TNL address information in the Xn-U Address Indication message.

In step S1603, the MN may send the MN RRC reconfiguration message to the UE including the SN RRC configuration message.

If yes in step S1602, the received information (that is, the indication/information in the RRC context to let UE know that QoE configuration and/or QoE reporting can be directly from/to SN) may be passed to UE.

If no in step S1602, the MN may decide to do it by itself. It may include the measConfigAppLayerContainer, which contains configuration of application layer measurements, and also service type. QoE areas (for example, cell list, TAI list, and PLMN list) may be also included.

In step S1604, the UE may apply the new configuration and reply to MN with the MN RRC reconfiguration complete message, including an SN RRC response message for SN, if needed. UE will perform the corresponding QoE services.

In case the UE is unable to comply with (part of) the configuration included in the MN RRC reconfiguration message, the UE may perform the reconfiguration failure procedure.

In step S1605, the MN may inform the SN that the UE has completed the reconfiguration procedure successfully via the SN Reconfiguration Complete message, including the SN RRC response message, if received from the UE.

In step S1606, if configured with bearers requiring SCG radio resources, the UE may perform synchronisation towards the PSCell configured by the SN. The order the UE sends the MN RRC reconfiguration complete message and performs the Random Access procedure towards the SCG may be not defined. The successful RA procedure towards the SCG may be not required for a successful completion of the RRC Connection Reconfiguration procedure.

In step S1607, if PDCP termination point is changed to the SN for bearers using RLC AM, and when RRC full configuration is not used, the MN may send the SN Status Transfer.

In step S1608, for SN terminated bearers or QoS flows moved from the MN, dependent on the characteristics of the respective bearer or QoS flow, the MN may take actions to minimise service interruption due to activation of MR-DC (Data forwarding).

In steps S1609-S1612, if applicable, the update of the UP path towards the 5GC may be performed via a PDU Session Path Update procedure.

Figure 17:
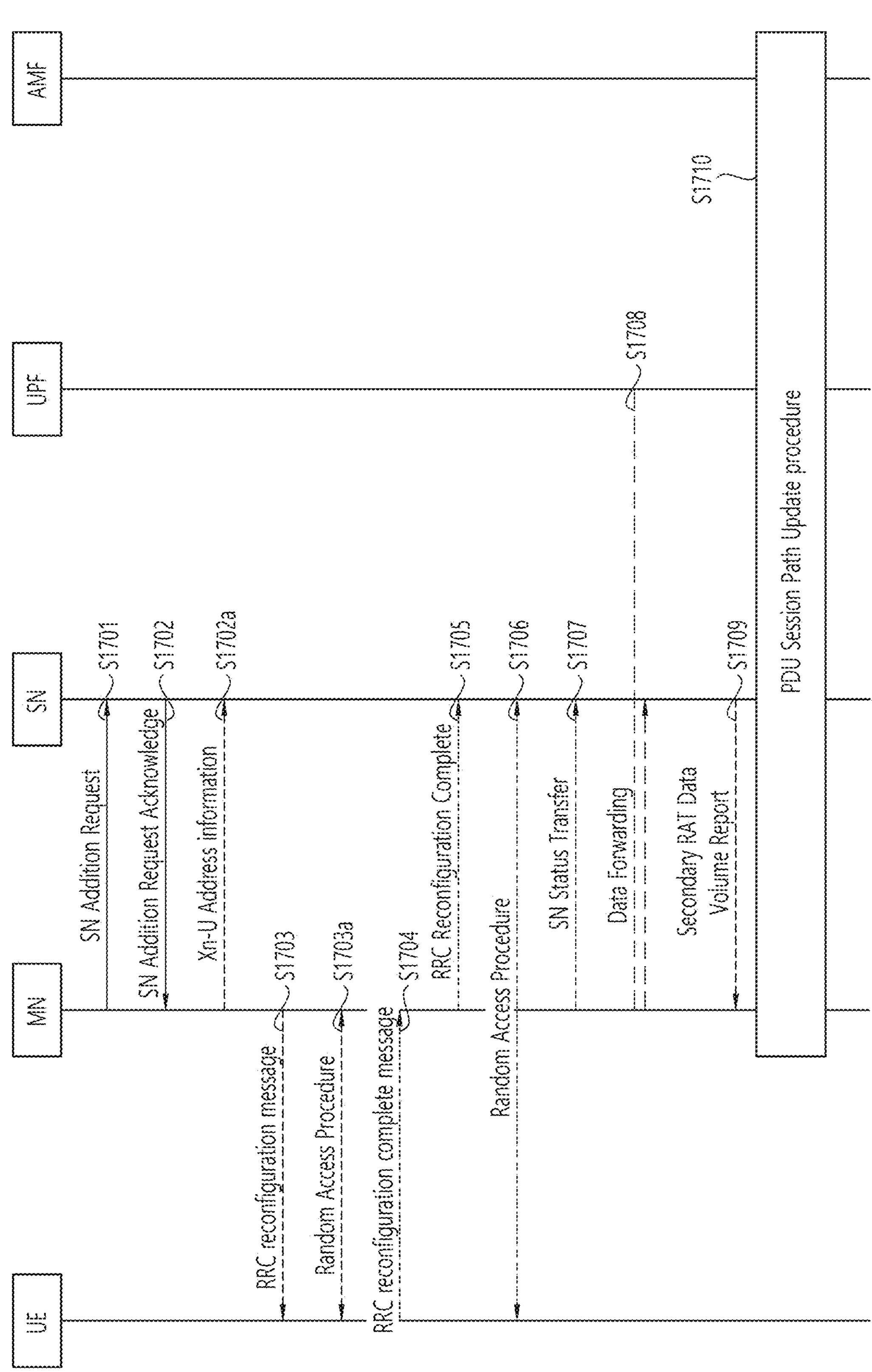
FIG. 17 shows an example of a SN Modification procedure for QoE Service in a wireless communication system.

FIG. 17 shows an example of a SN Modification procedure for QoE Service in a wireless communication system.

In particular, FIG. 17 illustrates a diagram for triggering and/or releasing QoE service during the SN Modification procedure.

The SN Modification procedure may be initiated either by the MN or by the SN and be used to modify the current user plane resource configuration (for example, related to PDU session, QoS flow or DRB) or to modify other properties of the UE context within the same SN.

It may also be used to transfer an RRC message from the SN to the UE via the MN and the response from the UE via MN to the SN (for example, when SRB3 is not used). In NGEN-DC and NR-DC, the RRC message may be an NR message (i.e., RRCReconfiguration) whereas in NE-DC it may be an E-UTRA message (i.e., RRCConnectionReconfiguration). In case of CPC, this procedure may be used to configure or modify CPC configuration within the same SN. The CPC configuration cannot be used to configure target PSCell in NE-DC.

In this example, the MN may use the procedure to initiate configuration changes of the SCG within the same SN, including addition, modification or release of the user plane resource configuration. The MN may use this procedure to perform handover within the same MN while keeping the SN, when the SN needs to be involved (i.e. in NGEN-DC). The MN may also use the procedure to query the current SCG configuration, for example, when delta configuration is applied in an MN initiated SN change. The MN may also use the procedure to provide the S-RLF related information to the SN or to provide additional available DRB IDs to be used for SN terminated bearers.

The MN may not use the procedure to initiate the addition, modification or release of SCG SCells. The SN may reject the request, except if it concerns the release of the user plane resource configuration, or if it is used to perform handover within the same MN while keeping the SN.

Referring to FIG. 17, in step S1701, the MN may send the SN Modification Request message, which may contain user plane resource configuration related or other UE context related information, PDU session level Network Slice info and the requested SCG configuration information, including the UE capabilities coordination result to be used as basis for the reconfiguration by the SN. In case a security key update in the SN is required, a new SN Security Key is included.

In step S1701-2, based on the signalling load or other situation of MN, MN may decide to let SN help it to perform some QoE services for this UE.

In this case, the request message (that is, the SN Modification Request message) may include the indication(s) of requesting QoE configuration and/or QoE reporting in SN (for example, existing or other SRB). The S-NG-RAN node may take it into account to configure radio resources for QoE configuration and/or QoE reporting via existing or other SRB.

The request message (that is, the SN Modification Request message) may also include the QoE related parameters (for example, QoE application layer measurement configuration, QoE areas (cell list, TAI list, and PLMN list), QoE service type, and QoE server IP address).

In step S1701-2, based on the signalling load or other situation of MN, MN may decide to release the QoE services in SN for this UE.

In this case, request message (that is, the SN Modification Request message) may the indication(s) of releasing the previous requested QoE configuration and/or QoE reporting in SN (for example, existing or other SRB). The S-NG-RAN node may use it to release the radio resources for QoE configuration and/or QoE reporting via existing or other SRB.

In step S1702, the SN may respond with the SN Modification Request Acknowledge message, which may contain new SCG radio configuration information within an SN RRC reconfiguration message, and data forwarding address information (if applicable).

In step S1702-1, in the response message (that is, the SN Modification Request Acknowledge message), it may include the response indication(s) on whether the requested QoE configuration and/or QoE reporting in SN (for example, via existing or other SRB) is accepted or not.

If yes (that is, if the requested QoE reporting is accepted by the SN), the requested QoE configuration and QoE reporting will be done in SN, it may include the indication to tell MN, and/or it may include the indication/information in the RRC context to let UE know that QoE configuration and/or QoE reporting can be directly from/to SN.

If no (that is, if the requested QoE reporting is not accepted by the SN), it may include the indication to tell MN that the requested QoE configuration and/or QoE reporting in SN is not accepted. Thus, MN may need to perform QoE configuration and/or QoE reporting by itself using the existing or other SRB.

In step S1702-2, in the response message, it may include the response on whether the releasing of the previous requested QoE configuration and/or QoE reporting in SN (for example, existing or other SRB) is done or not.

For example, for MN terminated bearers to be setup for which PDCP duplication with CA is configured in NR SCG side, the MN allocates up to 4 separate Xn-U bearers and the SN provides a logical channel ID for primary or split secondary path to the MN.

For SN terminated bearers to be setup for which PDCP duplication with CA is configured in NR MCG side, the SN allocates up to 4 separate Xn-U bearers and the MN provides a logical channel ID for primary or split secondary path to the SN via an additional MN-initiated SN modification procedure.

In step S1702*a*, when applicable, the MN may provide data forwarding address information to the SN. For SN terminated bearers using MCG resources, the MN may provide Xn-U DL TNL address information in the Xn-U Address Indication message.

In steps S1703 and S1704, the MN may initiate the RRC reconfiguration procedure, including an SN RRC reconfiguration message.

The UE may apply the new configuration, synchronize to the MN (if instructed, in case of intra-MN handover) and reply with the MN RRC reconfiguration complete message, including an SN RRC response message, if needed. In case the UE is unable to comply with (part of) the configuration included in the MN RRC reconfiguration message, it may perform the reconfiguration failure procedure.

In step S1703-1, if yes in step S1702-1, the received information (that is, the indication/information in the RRC context to let UE know that QoE configuration and/or QoE reporting can be directly from/to SN) may be passed to UE.

Otherwise, if no in step S1702-1, the MN may include the measConfigAppLayerContainer, which contains configuration of application layer measurements, and also service type in the MN RRC reconfiguration message. QoE areas (cell list, TAI list, and PLMN list) may be also included in the MN RRC reconfiguration message.

In step S1703-2, for the case of step S1702-2, the release indication can be sent to UE to let UE know that QoE configuration and/or QoE reporting is to be released in SN. The information can be container format from SN or set by MN.

In step S1705, upon successful completion of the reconfiguration, the success of the procedure may be indicated in the SN Reconfiguration Complete message.

In step S1706, if instructed, the UE may perform synchronisation towards the PSCell of the SN as described in SN addition procedure. Otherwise, the UE may perform UL transmission after having applied the new configuration.

In step S1707, if PDCP termination point is changed for bearers using RLC AM, and when RRC full configuration is not used, the SN Status Transfer may take place between the MN and the SN (For example, FIG. 17 may depict the case where a bearer context is transferred from the MN to the SN).

In step S1708, if applicable, data forwarding between MN and the SN may take place (For example, FIG. 17 may depict the case where a user plane resource configuration related context is transferred from the MN to the SN).

In step S1709, the SN may send the Secondary RAT Data Usage Report message to the MN and includes the data volumes delivered to and received from the UE.

For example, the order the SN sends the Secondary RAT Data Usage Report message and performs data forwarding with MN may be not defined. The SN may send the report when the transmission of the related QoS flow is stopped.

In step S1710, if applicable, a PDU Session path update procedure may be performed.

Hereinafter, a method for on QoE reporting from the SN is described.

FIG. 18 shows an example of a method for reporting QoE measurement results by SN.

In step S1801, OAM or CN may initiate the activation of the QoE measurement configured by OAM, and send the QoE measurement configuration to the master node (MN).

In step S1802, MN may decide to let SN perform QoE measurement according to the procedure in FIG. 16 or FIG. 17.

In step S1803, SN node may transmit RRC message to UE for the QoE measurement configuration. The QoE measurement configuration could be transmitted directly to the UE or passed through MN as shown in FIG. 16 or FIG. 17.

In step S1804 and S1805, UE AS layer may send the QoE measurement configuration to UE application layer, which performs measurements according to the configuration received. UE application layer may generate the QoE report and send it to the UE AS layer.

In step S1806, UE AS layer may send QoE report in a container format to SN node via a separate SRB, in which an indication is included to let SN know that this report should be passed to MN.

The indication can be realized by the specific ID of this UE or the IP address of the final TCE/MCE or QoE service type.

For the QoE measurement triggered by SN itself, the report from UE will be passed to the TCE/MCE directly. In this case, the QoE report from UE may not have the indication from UE. Otherwise the indication/UE ID/IP Address/QoE service type may be included in this case as well, which will be used for SN to decide to send the report directly to server.

In step S1806*a*, SN may make the decision on whether to send to the QoE report directly to server (for example, TCE/MCE) or it may pass the report to MN based on the respective indication/information from UE in step S1806.

In step S1807, if the report should be sent to server (for example, TCE/MCE) directly, SN may decide when to send it based on the information received from UE.

If the report should be passed to MN, SN may insert the QoE report in a container format in an Xn message, which is sent to MN with indication/information of this QoE report on the UE's information or the IP address to be transmitted to.

In step S1808, based on the information received, MN may decide when and where to send the QoE report to.

Some of the detailed steps shown in the example of FIGS. 15, 16, 17, and 18 may not be essential steps and may be omitted. In addition, steps other than the steps shown in FIGS. 15, 16, 17, and 18 may be added, and the order of the steps may vary. Some of the above steps may have their own technical meaning.

Hereinafter, an apparatus for handling QoE report in a secondary node in a wireless communication system, according to some embodiments of the present disclosure, will be described.

For example, a secondary node (SN) may include a processor, and a memory. The processor may be configured to be coupled operably with the memory.

The processor may be configured to transmit, to a UE, a configuration for Quality of Experience (QoE) measurement. The QoE measurement may be initiated by an Operations, Administration and Maintenance (OAM) and/or a master node (MN). The processor may be configured to receive, from the UE, a QoE report based on the configuration. The processor may be configured to determine whether to forward the QoE report to (i) a Trace Collection Entity (TCE) and/or a Measurement Collection Entity (MCE) and/or (ii) the MN, based on which entity among the OAM and/or the MN initiates the QoE measurement. The processor may be configured to forward the QoE report based on the determination.

For example, the QoE report may be forwarded to the TCE and/or the MCE, based on that the OAM initiates the QoE measurement.

For example, the QoE report may be forwarded to the MN, based on that the MN initiates the QoE measurement. In this case, the processor may be configured to transmit, to the MN, an Xn message including a container. The QoE report may be included in the container.

For example, the QoE report may include information informing destination of the QoE report. In this case, the QoE report may be forwarded to the destination.

For example, the QoE report may include an explicit indication or a specific identifier (ID) of the UE. In this case, the processor may be configured to determine which entity among the OAM and/or the MN initiates the QoE measurement, based on the specific ID of the UE.

For example, the QoE report may include a QoE service type. In this case, the processor may be configured to determine which entity among the OAM and/or the MN initiates the QoE measurement, based on the QoE service type.

For example, the QoE report may include an internet protocol (IP) address of the TCE and/or the MCE. In this case, the QoE report may be forwarded to the TCE and/or the MCE directly.

For example, the processor may be configured to receive, from the UE, a Radio Resource Control (RRC) message including a container. In this case, the QoE report may be included in the container.

For example, the QoE report may be received from the UE via a Signalling Radio Bearer (SRB).

According to some embodiments of the present disclosure, the UE may be in communication with at least one of a user equipment, a network, or an autonomous vehicle other than the UE.

Hereinafter, a processor for a secondary node (SN) for handling QoE report in a secondary node in a wireless communication system, according to some embodiments of the present disclosure, will be described.

The processor may be configured to control the SN to transmit, to a UE, a configuration for Quality of Experience (QoE) measurement. The QoE measurement may be initiated by an Operations, Administration and Maintenance (OAM) and/or a master node (MN). The processor may be configured to control the SN to receive, from the UE, a QoE report based on the configuration. The processor may be configured to control the SN to determine whether to forward the QoE report to (i) a Trace Collection Entity (TCE) and/or a Measurement Collection Entity (MCE) and/or (ii) the MN, based on which entity among the OAM and/or the MN initiates the QoE measurement. The processor may be configured to control the SN to forward the QoE report based on the determination.

For example, the QoE report may be forwarded to the TCE and/or the MCE, based on that the OAM initiates the QoE measurement.

For example, the QoE report may be forwarded to the MN, based on that the MN initiates the QoE measurement. In this case, the processor may be configured to control the SN to transmit, to the MN, an Xn message including a container. The QoE report may be included in the container.

For example, the QoE report may include information informing destination of the QoE report. In this case, the QoE report may be forwarded to the destination.

For example, the QoE report may include an explicit indication or a specific identifier (ID) of the UE. In this case, the processor may be configured to control the SN to determine which entity among the OAM and/or the MN initiates the QoE measurement, based on the specific ID of the UE.

For example, the QoE report may include a QoE service type. In this case, the processor may be configured to control the SN to determine which entity among the OAM and/or the MN initiates the QoE measurement, based on the QoE service type.

For example, the QoE report may include an internet protocol (IP) address of the TCE and/or the MCE. In this case, the QoE report may be forwarded to the TCE and/or the MCE directly.

For example, the processor may be configured to control the SN to receive, from the UE, a Radio Resource Control (RRC) message including a container. In this case, the QoE report may be included in the container.

For example, the QoE report may be received from the UE via a Signalling Radio Bearer (SRB).

According to some embodiments of the present disclosure, the UE may be in communication with at least one of a user equipment, a network, or an autonomous vehicle other than the UE.

Hereinafter, a non-transitory computer-readable medium has stored thereon a plurality of instructions for handling QoE report in a secondary node (SN) in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a secondary node (SN).

The stored a plurality of instructions may cause the SN to transmit, to a UE, a configuration for Quality of Experience (QoE) measurement. The QoE measurement may be initiated by an Operations, Administration and Maintenance (OAM) and/or a master node (MN). The stored a plurality of instructions may cause the SN to receive, from the UE, a QoE report based on the configuration. The stored a plurality of instructions may cause the SN to determine whether to forward the QoE report to (i) a Trace Collection Entity (TCE) and/or a Measurement Collection Entity (MCE) and/or (ii) the MN, based on which entity among the OAM and/or the MN initiates the QoE measurement. The stored a plurality of instructions may cause the SN to forward the QoE report based on the determination.

For example, the QoE report may be forwarded to the TCE and/or the MCE, based on that the OAM initiates the QoE measurement.

For example, the QoE report may be forwarded to the MN, based on that the MN initiates the QoE measurement. In this case, the stored a plurality of instructions may cause the SN to transmit, to the MN, an Xn message including a container. The QoE report may be included in the container.

For example, the QoE report may include information informing destination of the QoE report. In this case, the QoE report may be forwarded to the destination.

For example, the QoE report may include an explicit indication or a specific identifier (ID) of the UE. In this case, the stored a plurality of instructions may cause the SN to determine which entity among the OAM and/or the MN initiates the QoE measurement, based on the specific ID of the UE.

For example, the QoE report may include a QoE service type. In this case, the stored a plurality of instructions may cause the SN to determine which entity among the OAM and/or the MN initiates the QoE measurement, based on the QoE service type.

For example, the QoE report may include an internet protocol (IP) address of the TCE and/or the MCE. In this case, the QoE report may be forwarded to the TCE and/or the MCE directly.

For example, the stored a plurality of instructions may cause the SN to receive, from the UE, a Radio Resource Control (RRC) message including a container. In this case, the QoE report may be included in the container.

For example, the QoE report may be received from the UE via a Signalling Radio Bearer (SRB).

According to some embodiments of the present disclosure, the UE may be in communication with at least one of a user equipment, a network, or an autonomous vehicle other than the UE.

The present disclosure may have various advantageous effects.

According to some embodiments of the present disclosure, a secondary node could efficiently handle QoE reporting.

For example, a secondary node could prevent from confusing or misunderstanding on how to handle the report, when the secondary node receives the report from UE, since the secondary node may trigger the management based QoE measurement directly based on the configuration from OAM.

This will be helpful for supporting the QoE services in the important MR-DC deployment scenarios. Therefore, the user experience for various services, for example, AR/VR, URLLC, can be enhanced.

For example, a secondary node could efficiently determine whether to forward the QoE report to (i) a Trace Collection Entity (TCE) and/or a Measurement Collection Entity (MCE), and/or (ii) the MN, based on which entity among the OAM and/or the MN initiates the QoE measurement efficiently.

Therefore, the QoE reporting in dual connectivity could be performed without error.

According to some embodiments of the present disclosure, the wireless communication system could handle QoE reporting efficiently.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

The invention claimed is:

1. A method, comprising, generating, by a secondary node, a quality of experience (QoE) configuration;

transmitting, by the secondary node to a User Equipment (UE), the QoE configuration, wherein QoE measurements are initiated by either an Operations, Administration and Maintenance (OAM) or a master node;

receiving, by the secondary node from the UE, a QoE report, wherein the QoE report via the radio resource control message based on the QoE configuration, and wherein the QoE report includes (i) a identifier of the UE and (ii) a QoE service type;

determining, by the secondary node, whether the OAM or the master node initiates the QoE measurements, based on the identifier of the UE and the QoE service type;

based on that the QoE measurements are initiated by the OAM:

forwarding, by the secondary node, the QoE report to a Trace Collection Entity (TCE) and a Measurement Collection Entity (MCE);

based on that the QoE measurements are initiated by the master node:

transmitting, by the secondary node to the master node, a transfer message including the QoE report.

2. The method of claim 1, wherein the QoE report includes an internet protocol (IP) address of the TCE and the MCE.

3. The method of claim 2, wherein the QoE report is forwarded to the TCE and the MCE directly.

4. The method of claim 1, wherein the QoE report is received from the UE via a Signalling Radio Bearer (SRB).

5. The method of claim 1, wherein the UE is in communication with at least one of a user equipment, a network, or an autonomous vehicle other than the UE.

6. A secondary node, comprising:

a memory; and at least one processor operatively coupled to the memory, and configured to perform operations, the operations comprising:

generating a quality of experience (QoE) configuration;

transmitting, to a User Equipment (UE), the QoE configuration, wherein QoE measurements are initiated by either an Operations, Administration and Maintenance (OAM) or a master node;

receiving, from the UE, a QoE report, wherein the QoE report via the radio resource control message based on the QoE configuration, and wherein the QoE report includes (i) a identifier of the UE and (ii) a QoE service type;

determining whether the OAM or the master node initiates the QoE measurements, based on the identifier of the UE and the QoE service type;

based on that the QoE measurements are initiated by the OAM:

forwarding the QoE report to a Trace Collection Entity (TCE) and a Measurement Collection Entity (MCE);

based on that the QoE measurements are initiated by the master node:

transmitting, to the master node, a transfer message including the QoE report.

7. A method, comprising, receiving, by a wireless device from a secondary node, a quality of experience (QoE) configuration, wherein the QoE configuration is generated by the secondary node;

wherein QoE measurements are initiated by either an Operations, Administration and Maintenance (OAM) or a master node; and transmitting, by the wireless device to the secondary node, a QoE report based on the QoE configuration, wherein the QoE report includes (i) a identifier of the UE and (ii) a QoE service type, wherein the secondary node determines whether the OAM or the master node initiates the QoE measurements, based on the identifier of the UE and the QoE service type, wherein, based on that the QoE measurements are initiated by the OAM, the wireless device forwards the QoE report to a Trace Collection Entity (TCE) and a Measurement Collection Entity (MCE) to the secondary node, and wherein, based on that the QoE measurements are initiated by the master node, the secondary node transmits a transfer message including the QoE report to the master node.

* * * * *